US011154851B2

(12) United States Patent
Choa et al.

(10) Patent No.: US 11,154,851 B2
(45) Date of Patent: Oct. 26, 2021

(54) TWO-DIMENSIONAL MATERIAL FOR REMOVAL OF ANIONS AND APPLICATIONS THEREOF

(71) Applicant: INDUSTRY-UNIVERSITY COOPERATION FOUNDATION HANYANG UNIVERSITY ERICA CAMPUS, Ansan-si (KR)

(72) Inventors: Yong-Ho Choa, Seongnam-si (KR); Han-Seung Lee, Ansan-si (KR); Hong-Baek Cho, Ansan-si (KR); Yoseb Song, Ansan-si (KR); Su-Bean Yoo, Suwon-si (KR); Ji Young Park, Ansan-si (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 153 days.

(21) Appl. No.: 16/227,336

(22) Filed: Dec. 20, 2018

(65) Prior Publication Data
US 2020/0164356 A1    May 28, 2020

Related U.S. Application Data

(63) Continuation of application No. PCT/KR2018/015499, filed on Dec. 7, 2018.

(51) Int. Cl.
*B01J 41/02* (2006.01)
*B01J 41/10* (2006.01)
(Continued)

(52) U.S. Cl.
CPC .............. *B01J 41/02* (2013.01); *B01J 41/10* (2013.01); *C01F 7/002* (2013.01); *C01G 49/009* (2013.01);
(Continued)

(58) Field of Classification Search
CPC . B01J 41/02; B01J 41/10; C01F 7/002; C01G 49/009; C02F 1/42; C02F 2103/20;
(Continued)

(56) References Cited

FOREIGN PATENT DOCUMENTS

| KR | 10-1007888 B1 | 1/2011 |
| KR | 10-2011-0125910 A | 11/2011 |
| KR | 10-2013-0089587 A | 8/2013 |

OTHER PUBLICATIONS

Maria Richetta, "Characteristics, Preparation Routes and Metallurgical Applications of LDHs: An Overview", J Material Sci Eng., vol. 6, Issue 6, DOI: 10.4172/2169-0022.1000397, 2017, 11 pages total.

(Continued)

*Primary Examiner* — James C Yager
(74) *Attorney, Agent, or Firm* — Sughrue Mion, PLLC

(57) ABSTRACT

A method for preparing an anion adsorbent may be provided, which comprises the steps of: mixing at least two metal salts with each other, thereby forming a stack structure in which cationic compound layers and anionic compound layers containing anions and water of crystallization are alternately stacked on one another; performing a first heat treatment on the stack structure to expand between the cationic compound layers, thereby preparing a preliminary anion adsorbent; and performing a second heat treatment on the preliminary anion adsorbent to remove the anions and the water of crystallization from the anionic compound layers while allowing at least one of the anions to remain, thereby preparing the anion adsorbent.

8 Claims, 29 Drawing Sheets

(51) Int. Cl.
*C01F 7/00* (2006.01)
*C01G 49/00* (2006.01)
*C02F 1/42* (2006.01)
*C02F 103/20* (2006.01)
*C02F 103/16* (2006.01)

(52) U.S. Cl.
CPC ............ *C02F 1/42* (2013.01); *B32B 2315/00* (2013.01); *B32B 2315/02* (2013.01); *C01P 2002/22* (2013.01); *C01P 2002/72* (2013.01); *C01P 2002/82* (2013.01); *C01P 2004/03* (2013.01); *C01P 2004/04* (2013.01); *C01P 2006/12* (2013.01); *C02F 2001/422* (2013.01); *C02F 2103/16* (2013.01); *C02F 2103/20* (2013.01); *Y10T 428/13* (2015.01); *Y10T 428/131* (2015.01); *Y10T 428/1317* (2015.01)

(58) Field of Classification Search
CPC .................. C02F 2103/16; C02F 1/281; C02F 2101/105; C02F 2101/12; C02F 2101/20; Y10T 428/1317; Y10T 428/13; Y10T 428/131; B32B 2315/02; B32B 2315/00; C01P 2002/22; C01P 2002/72; C01P 2004/04; C01P 2002/82; C01P 2006/12; C01P 2001/422; C01P 2004/03
See application file for complete search history.

(56) References Cited

OTHER PUBLICATIONS

P. Benito et al., "Effect of post-synthesis microwave-hydrothermal treatment on the properties of layered double hydroxides and related materials", Applied Clay Science, vol. 48, pp. 218-227, 2010, 10 pages total.

[Fig. 1]
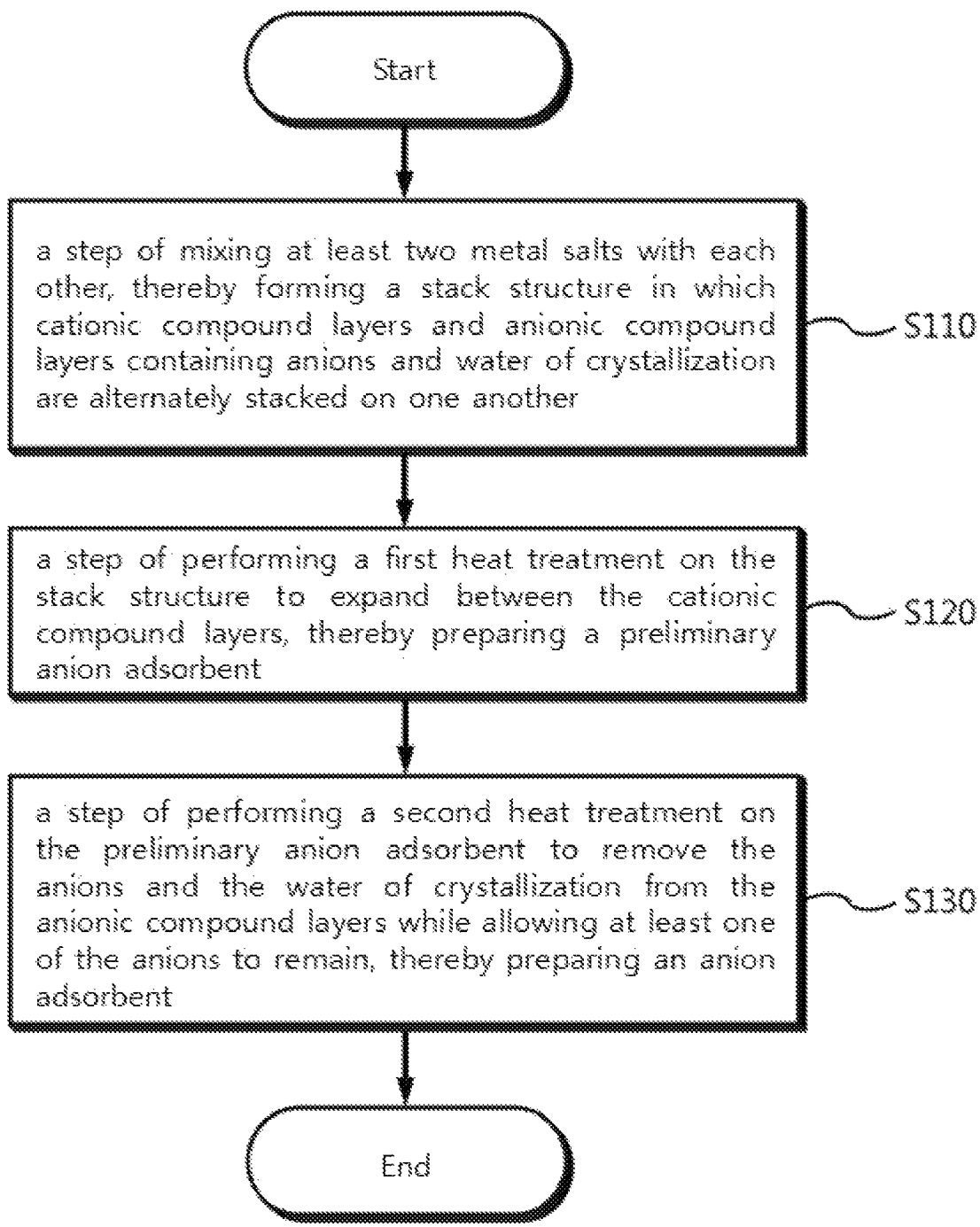

[Fig. 2]
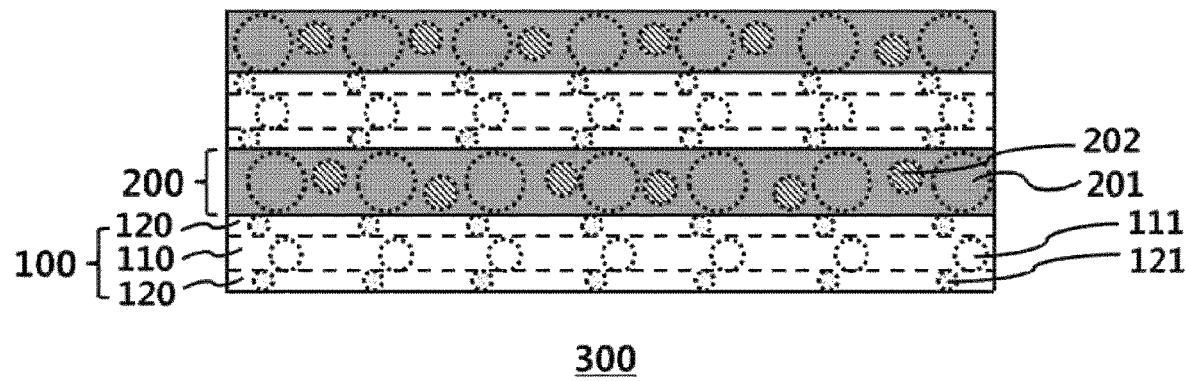

[Fig. 3]
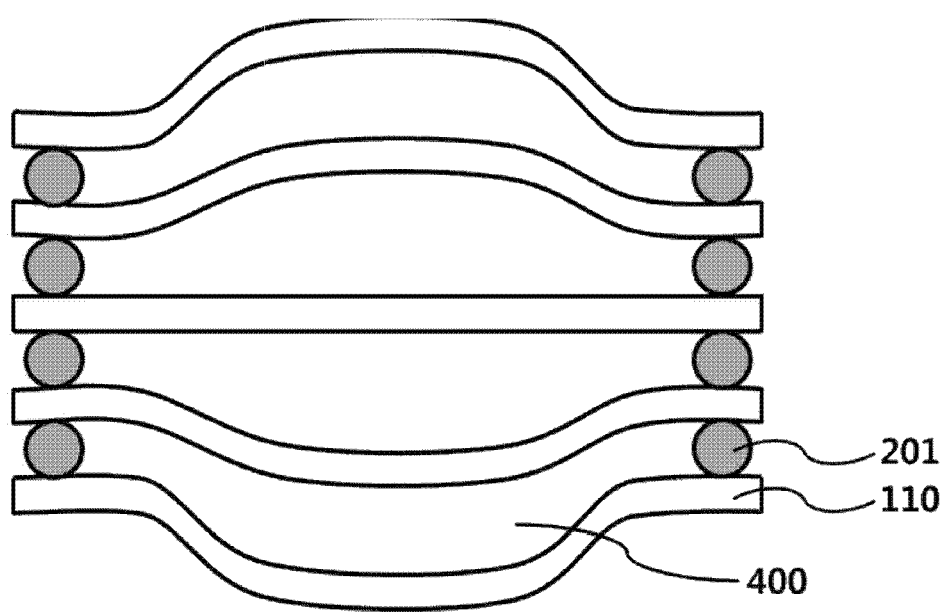

[Fig. 4]
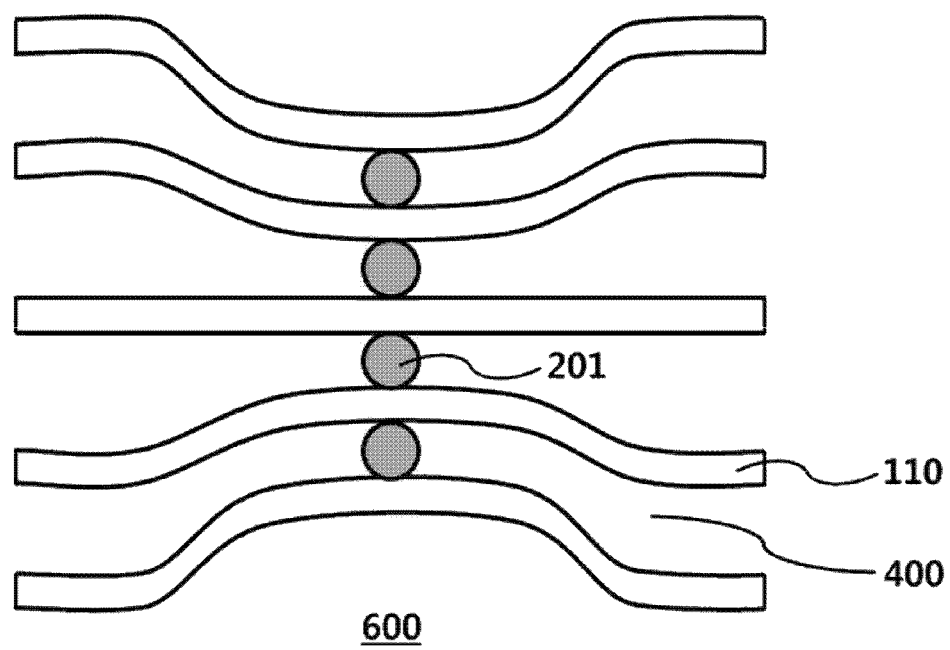

[Fig. 5]
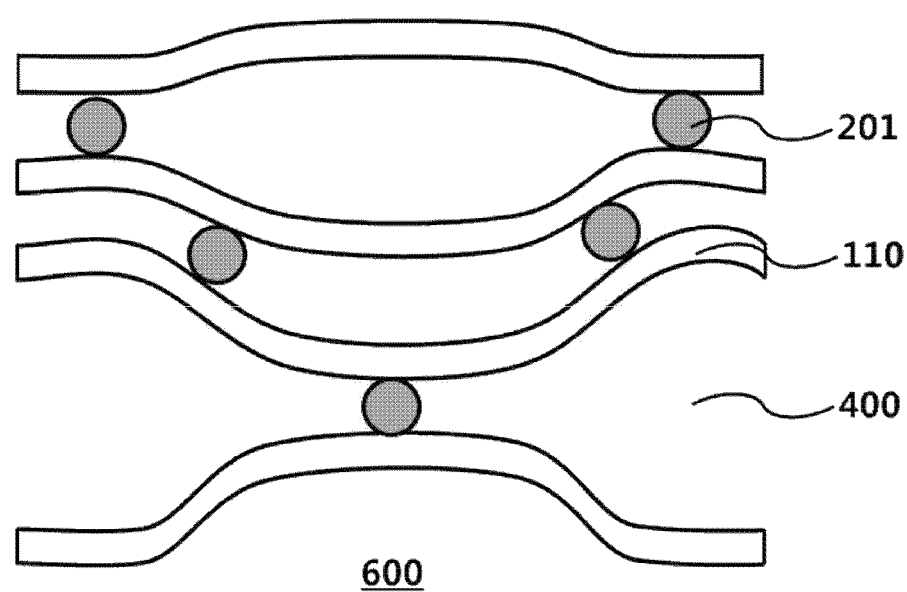

[Fig. 6]
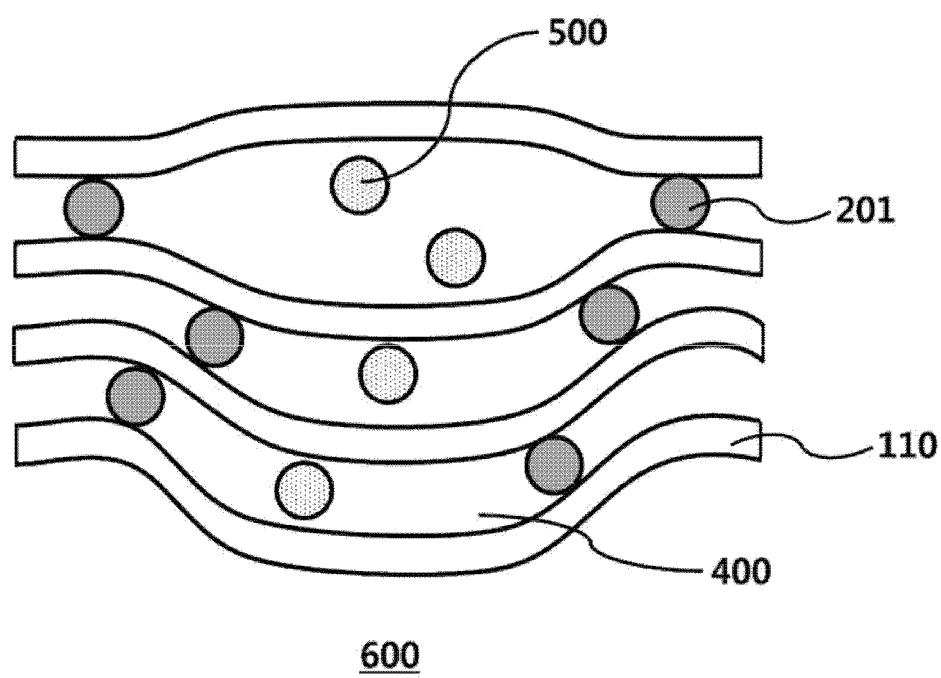

[Fig. 7]
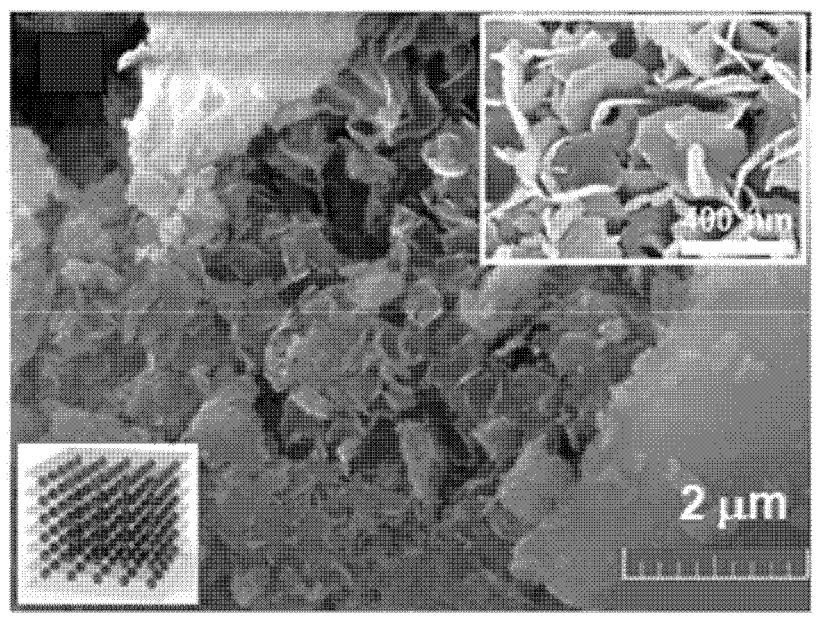

[Fig. 8]
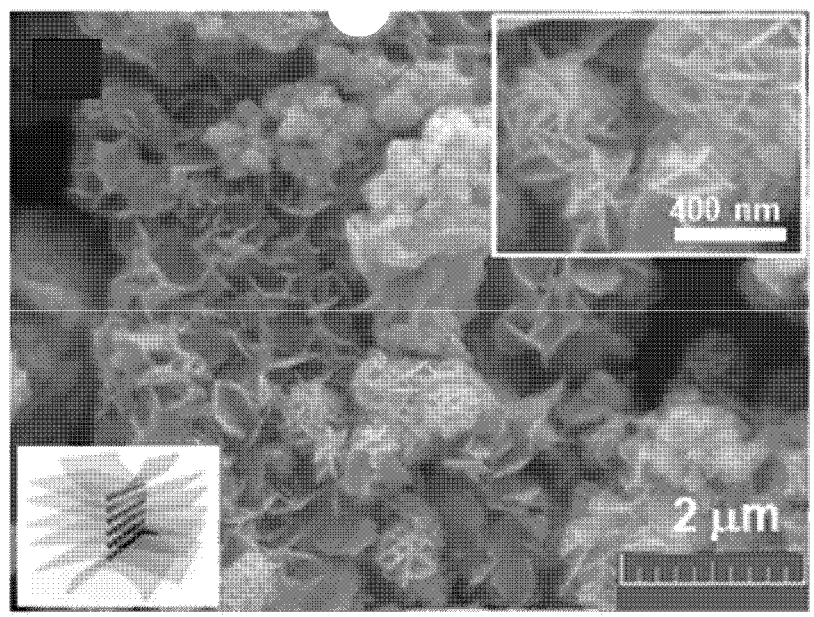

[Fig. 9]
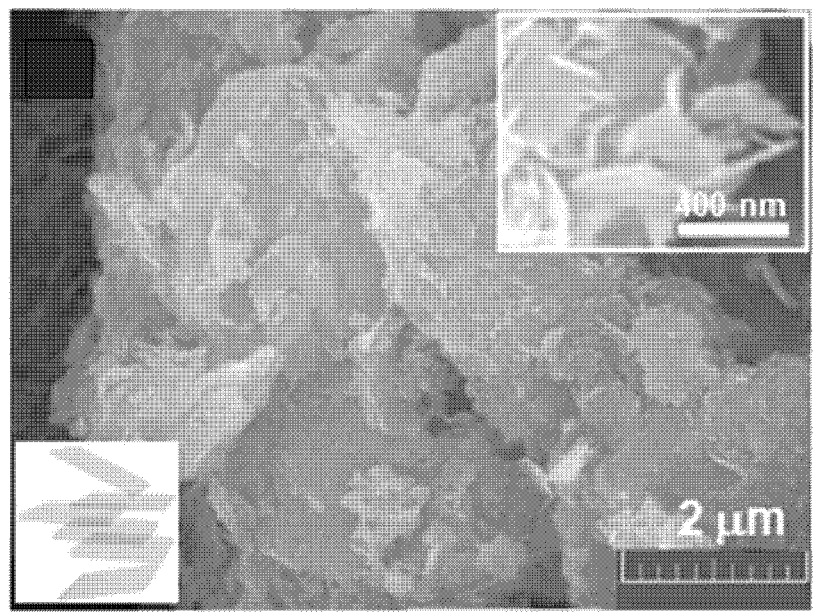

[Fig. 10]
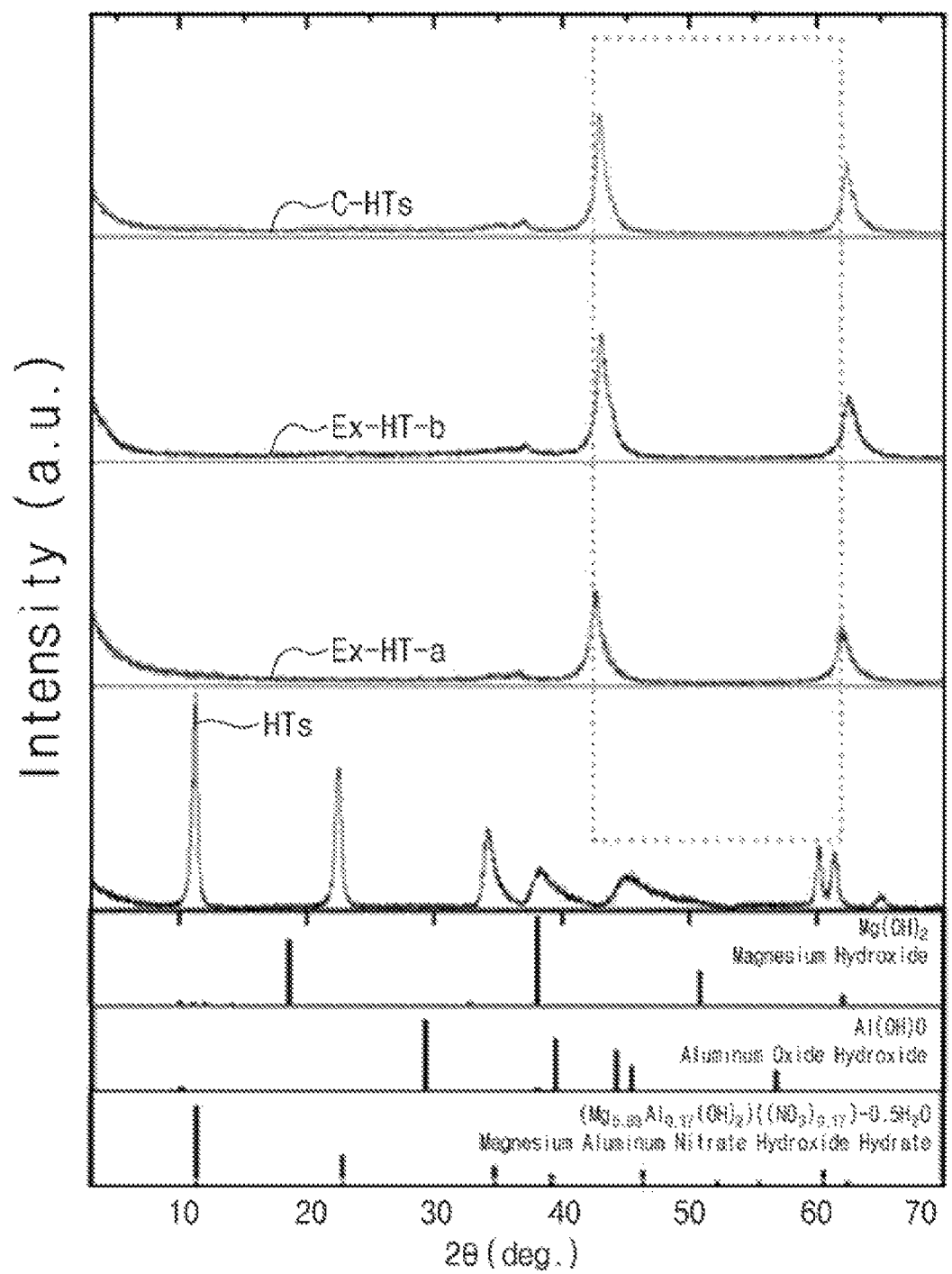

[Fig. 11]
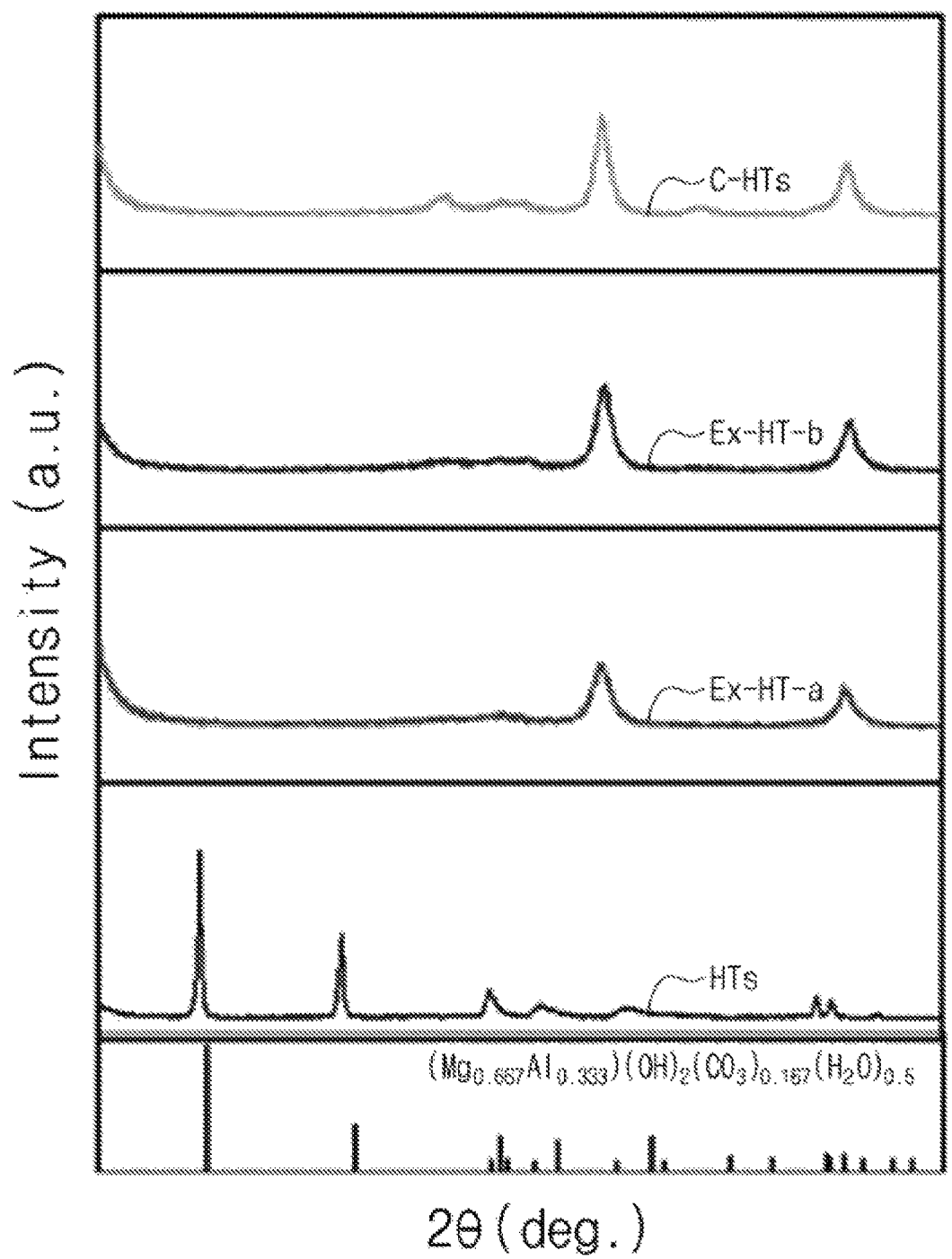

[Fig. 12]
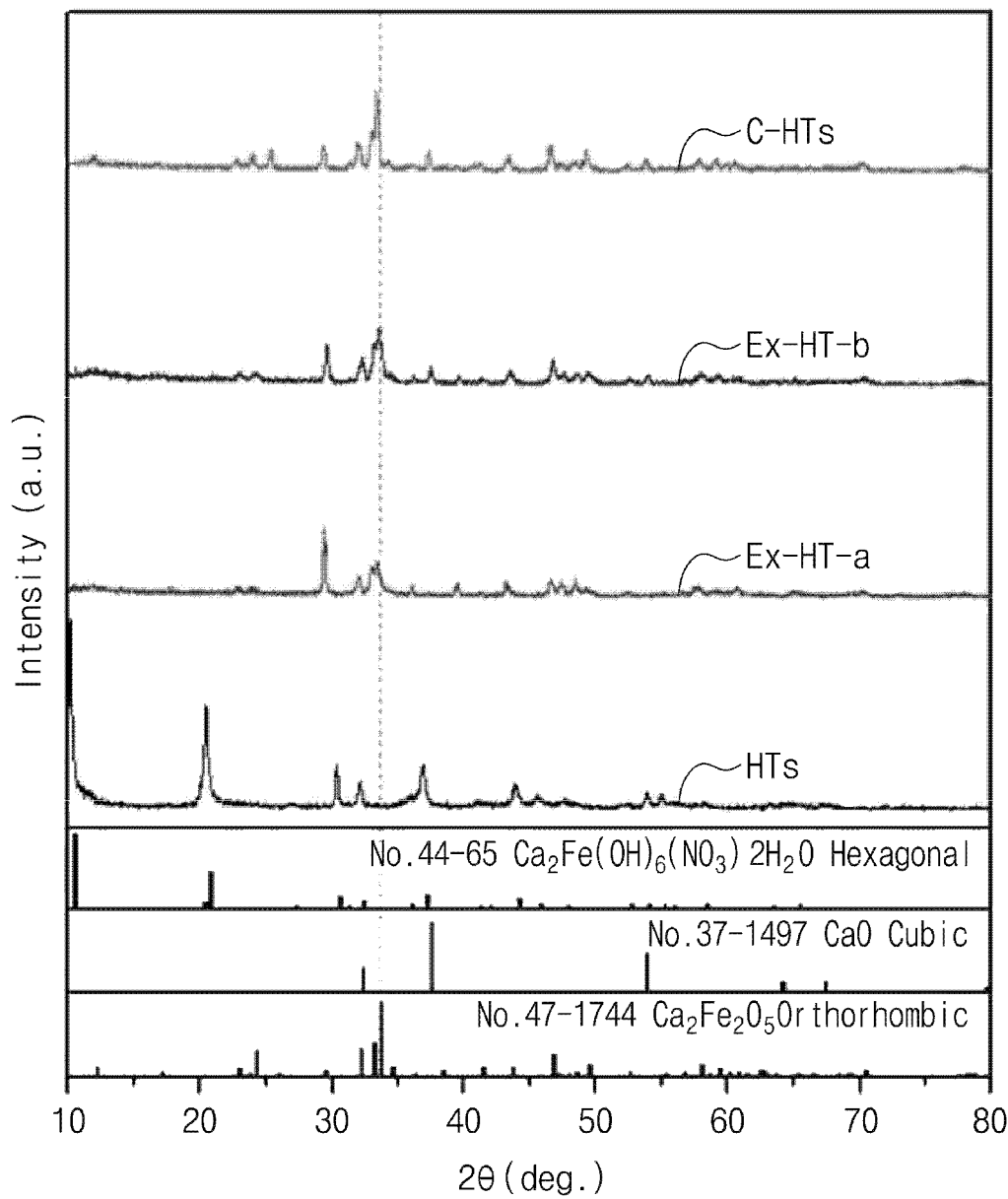

[Fig. 13]
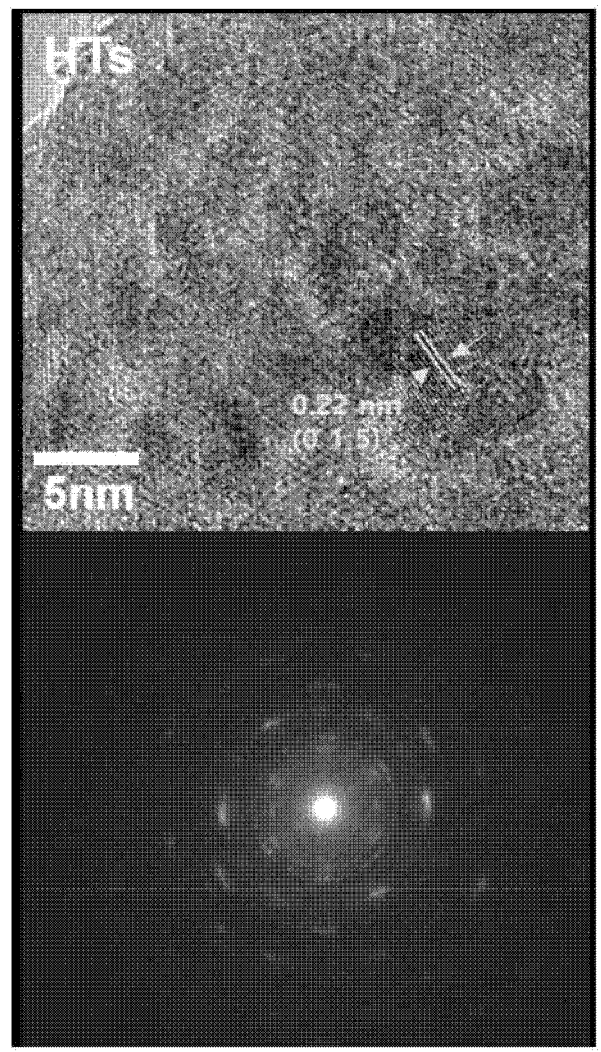

[Fig. 14]
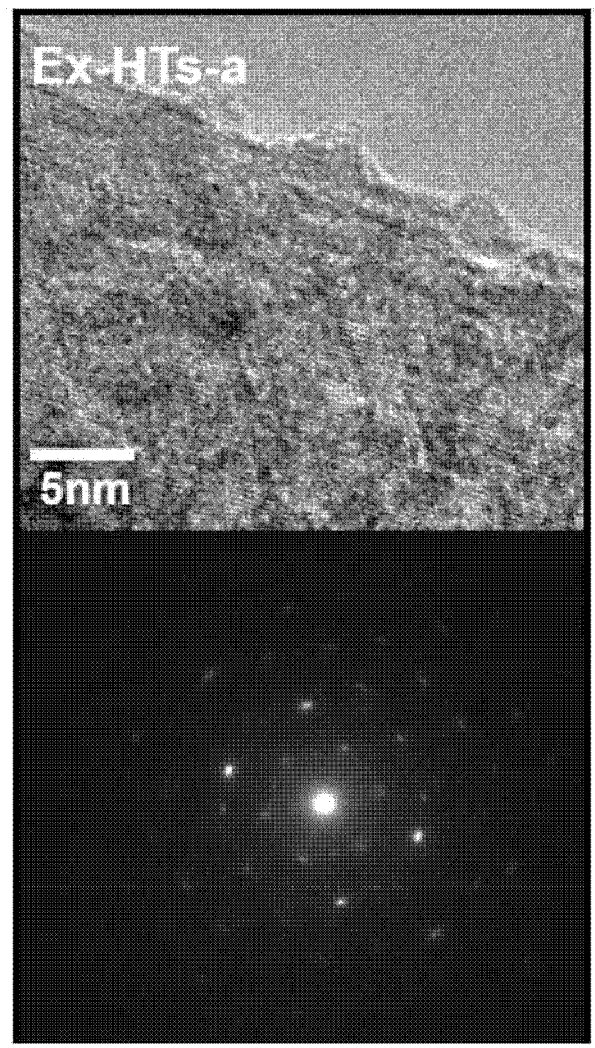

[Fig. 15]
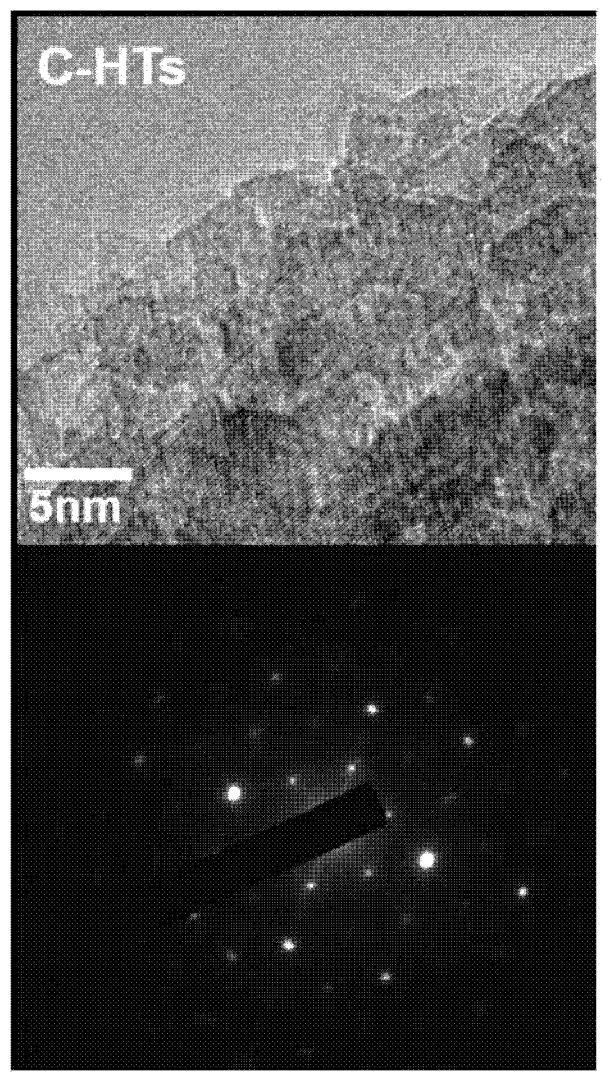

[Fig. 16]
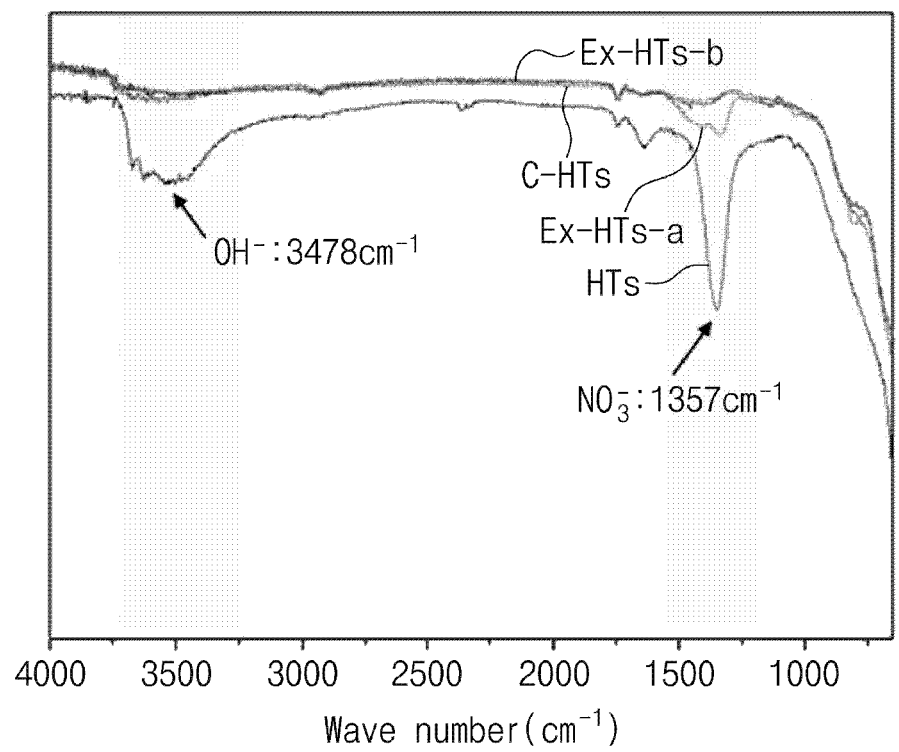

[Fig. 17]
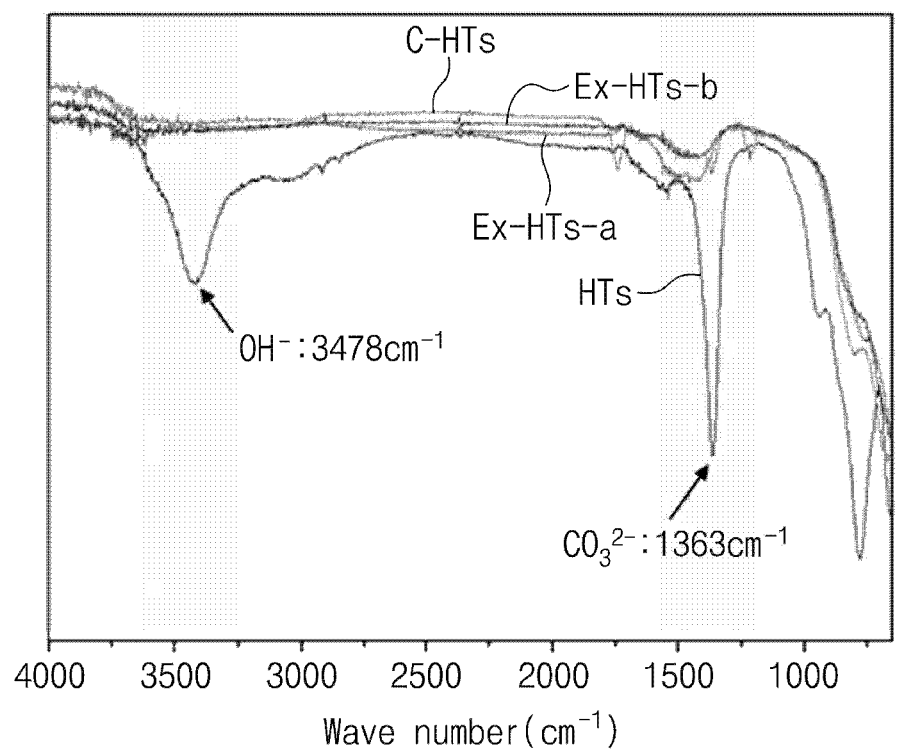

[Fig. 18]
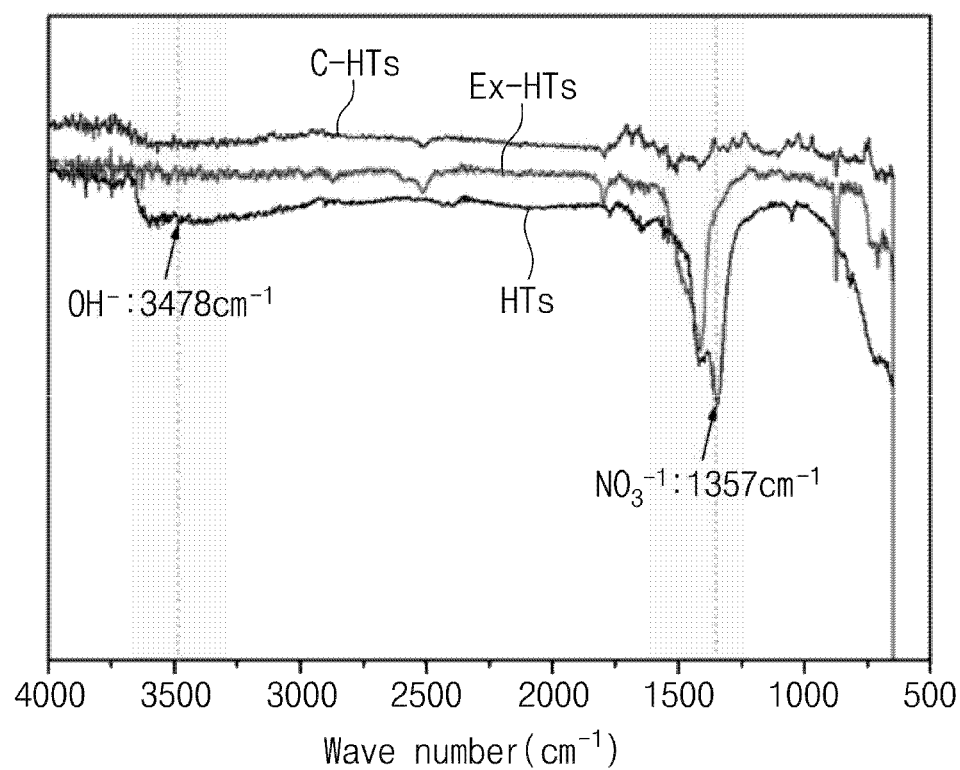

[Fig. 19]
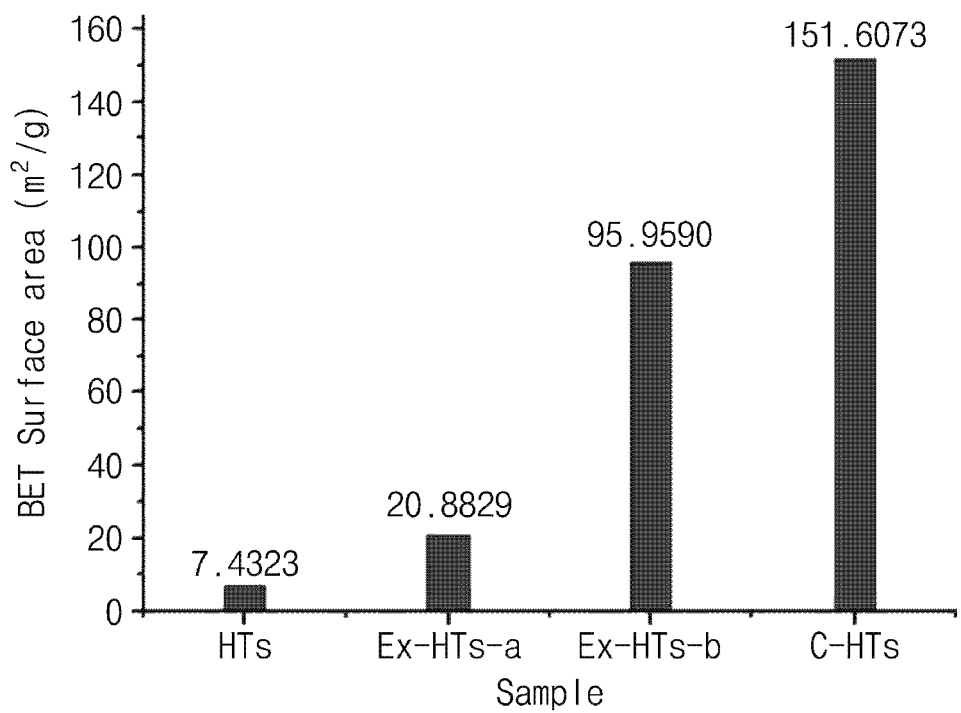

[Fig. 20]
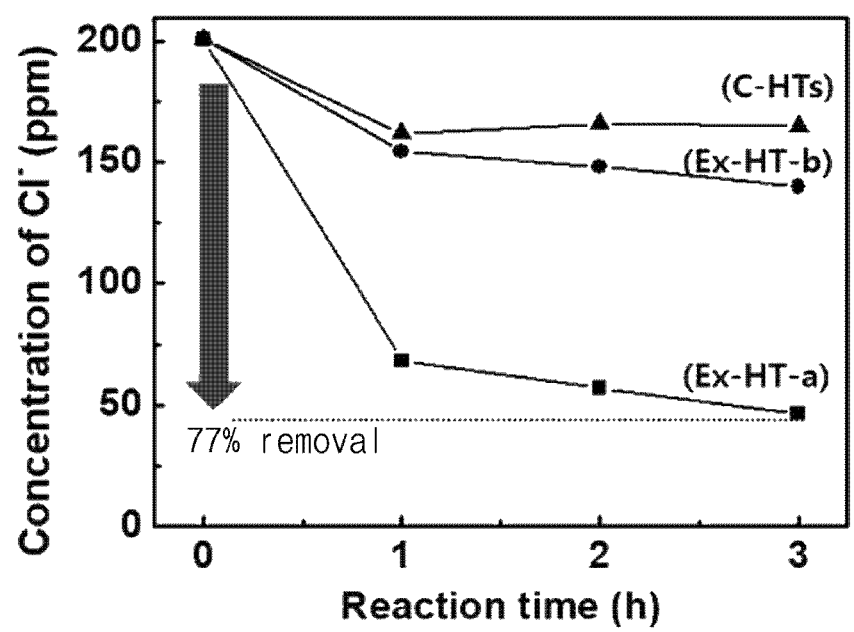

[Fig. 21]
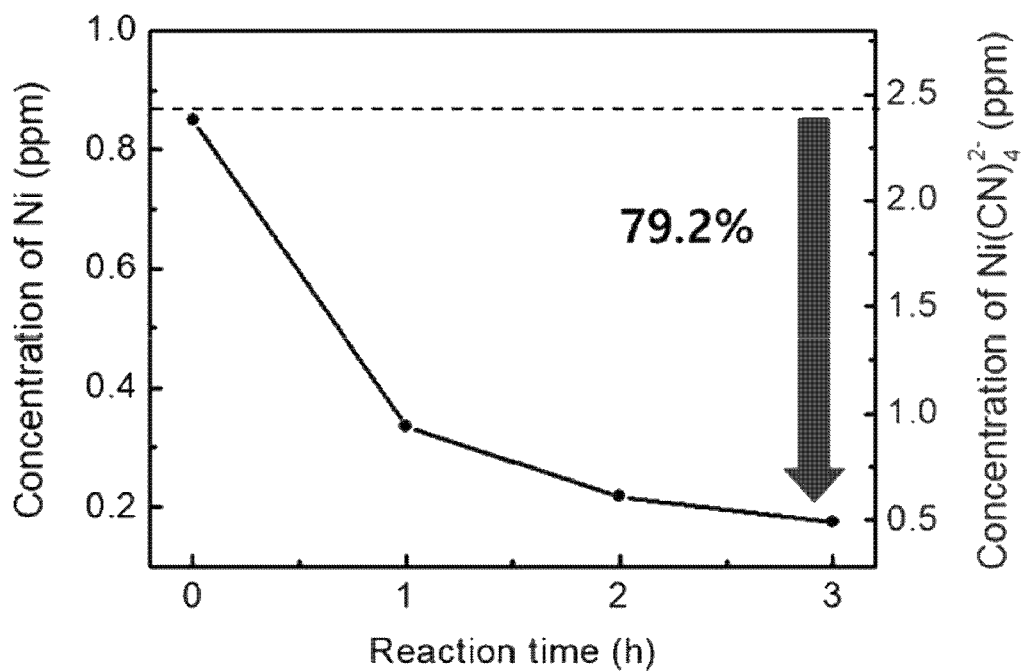

[Fig. 22]
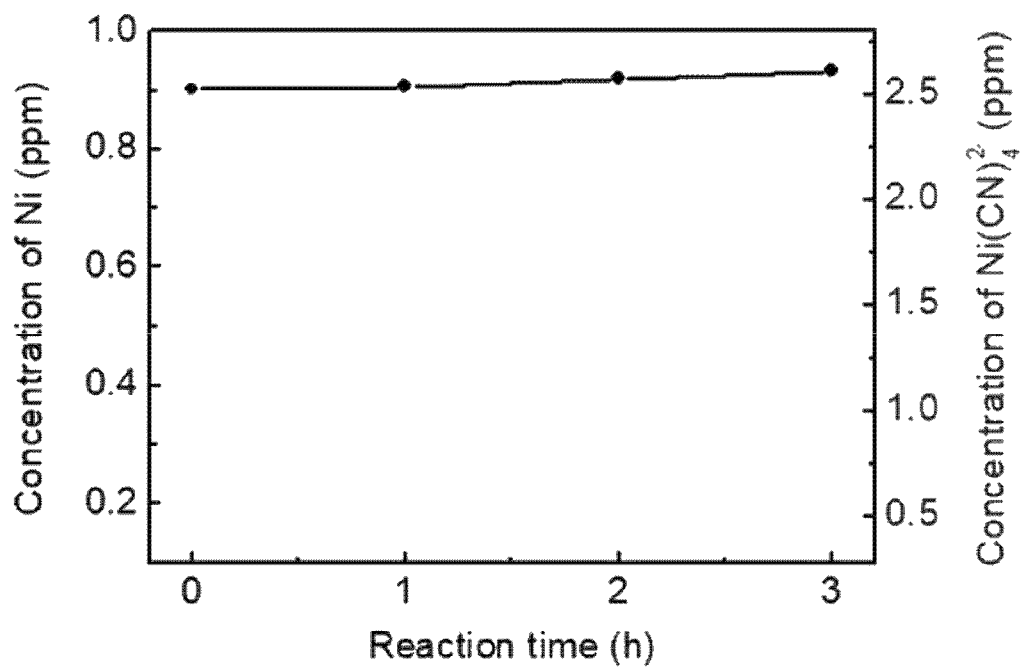

[Fig. 23]
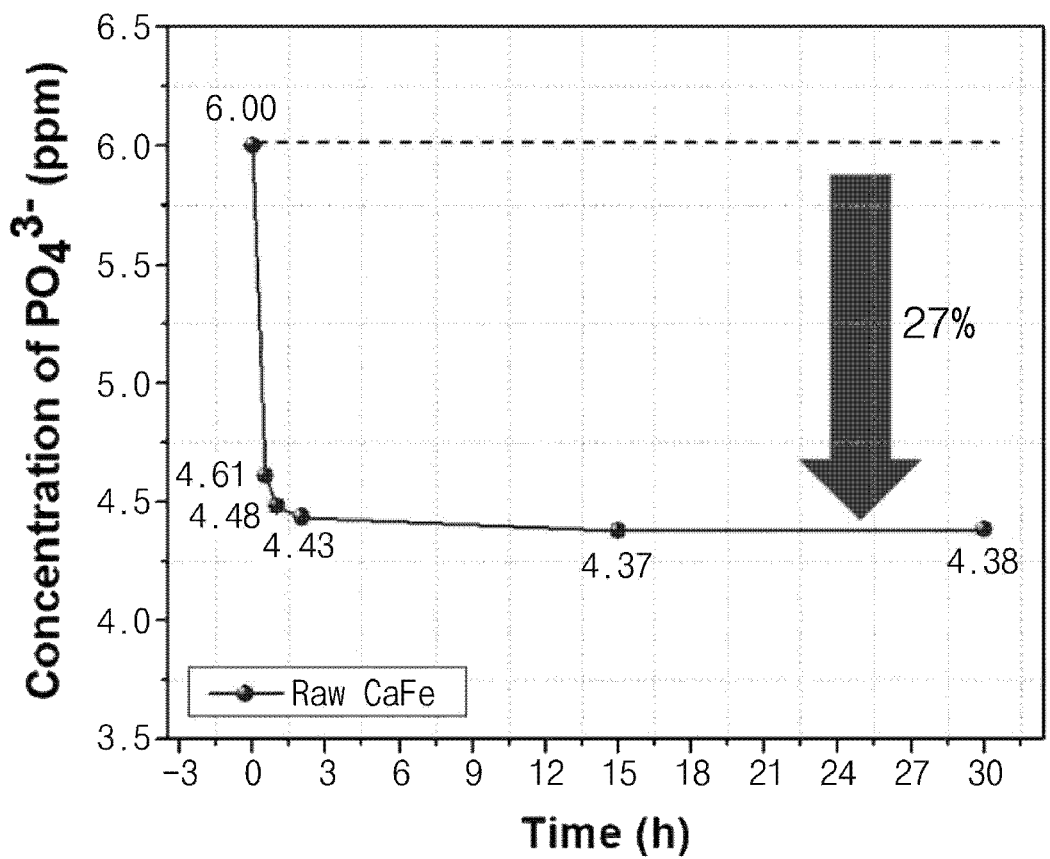

[Fig. 24]
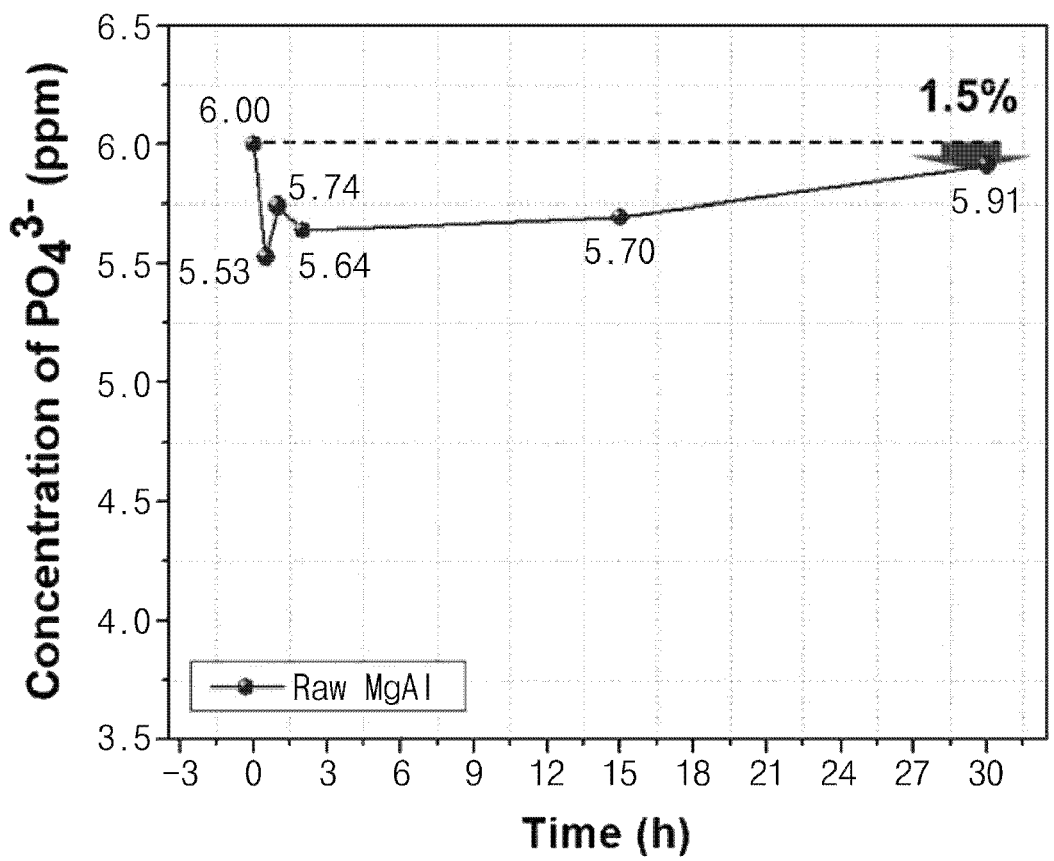

【Fig. 25】
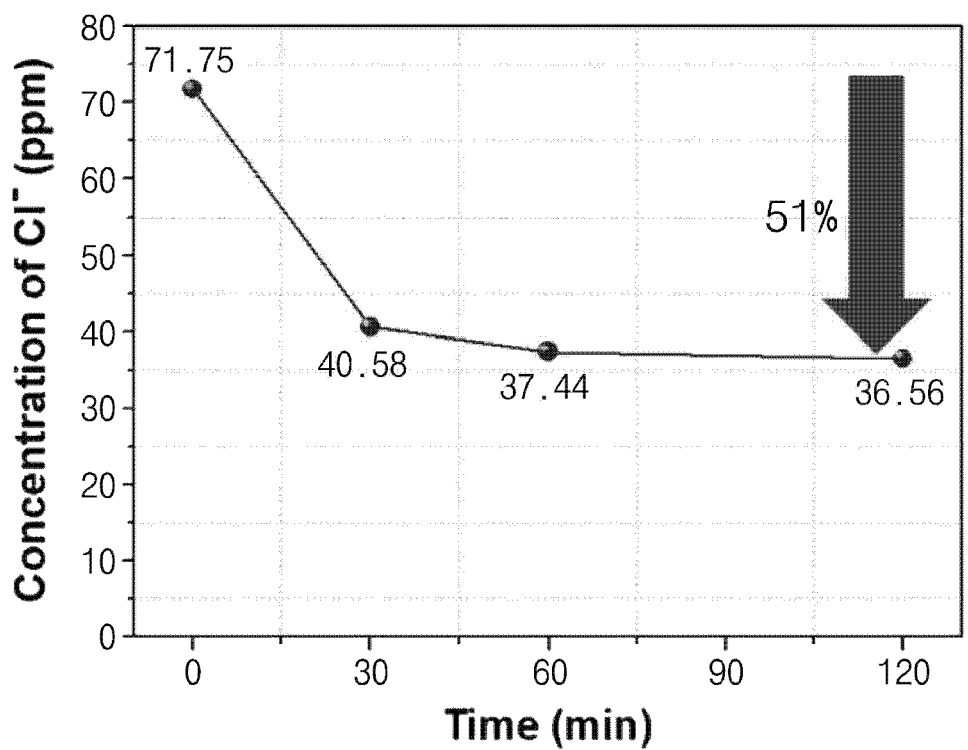

【Fig. 26】
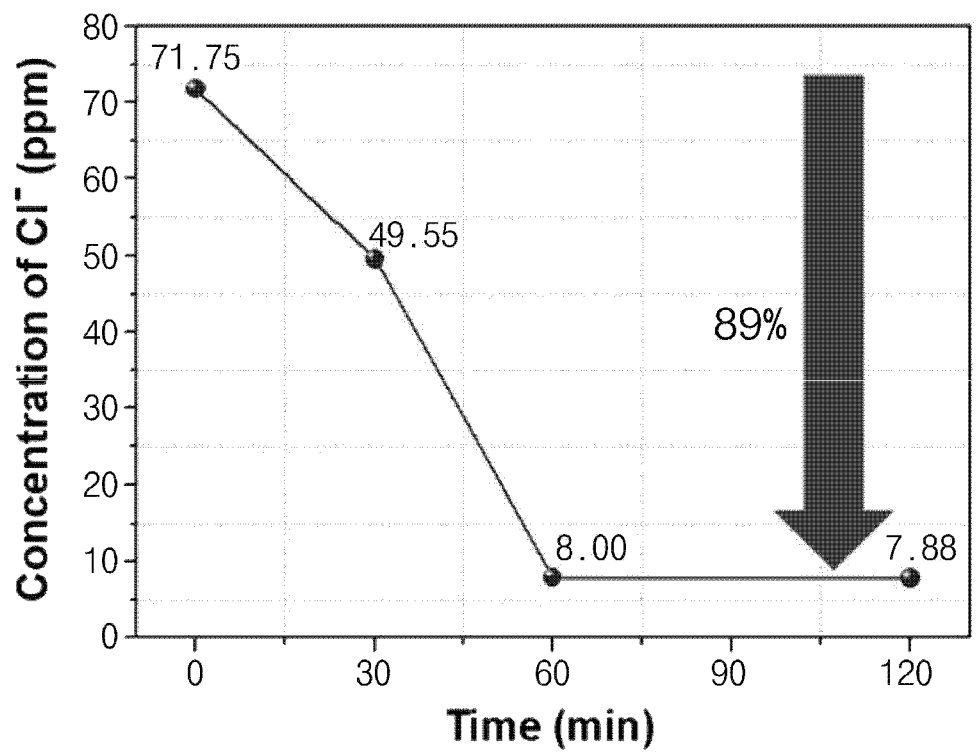

[Fig. 27]
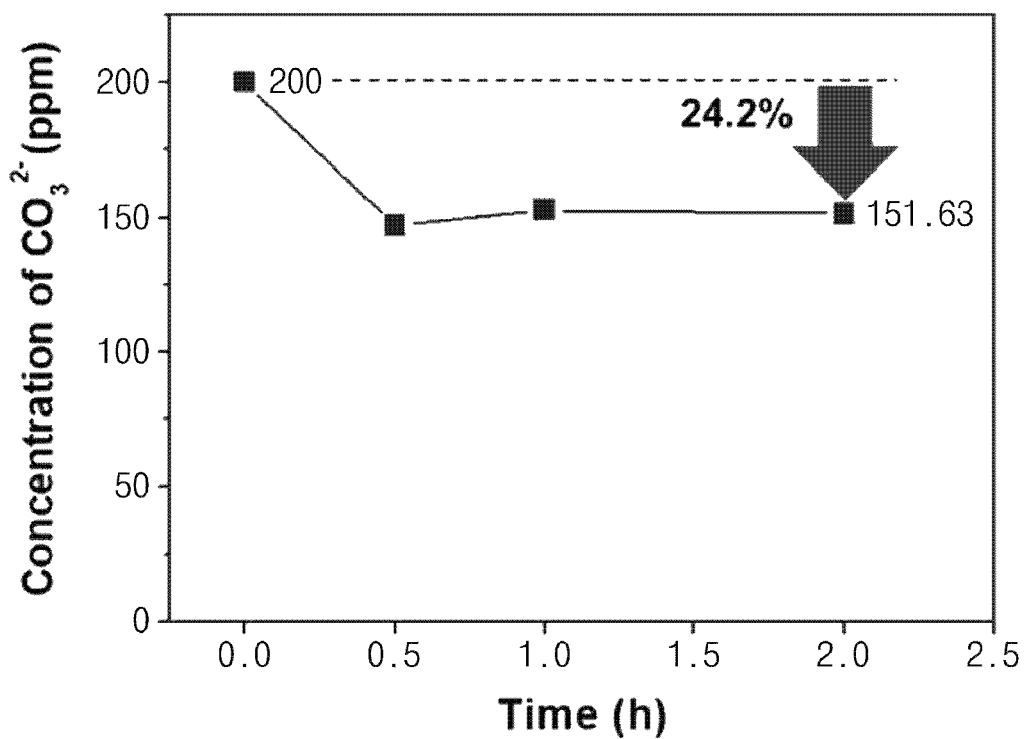

[Fig. 28]
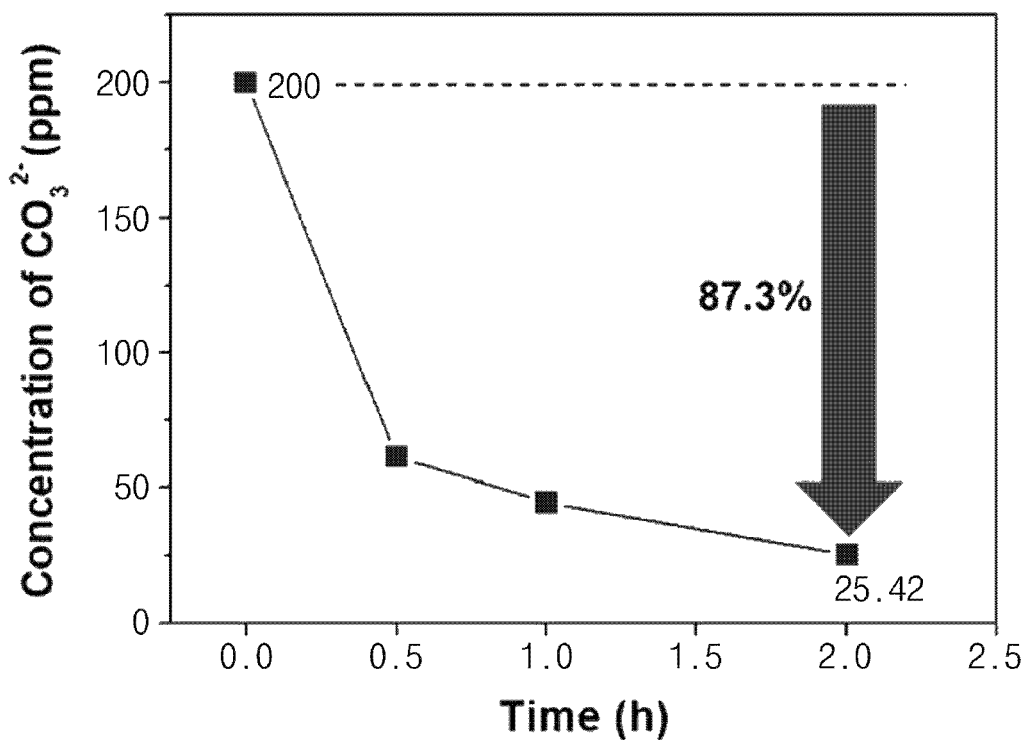

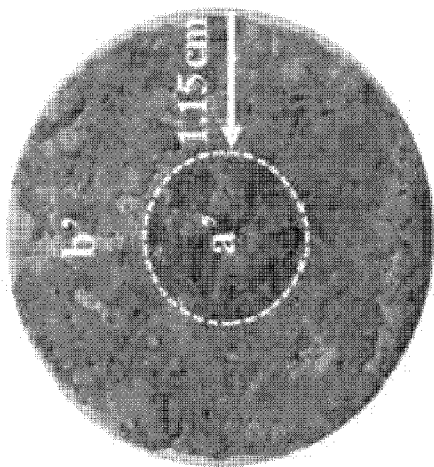
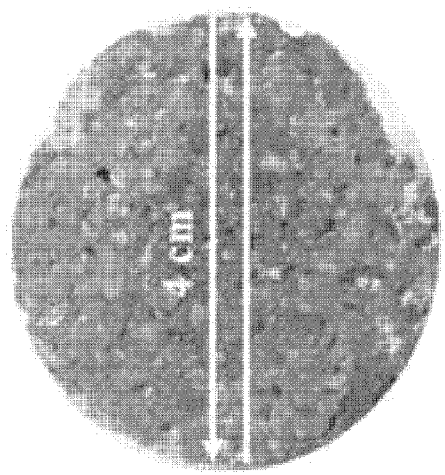
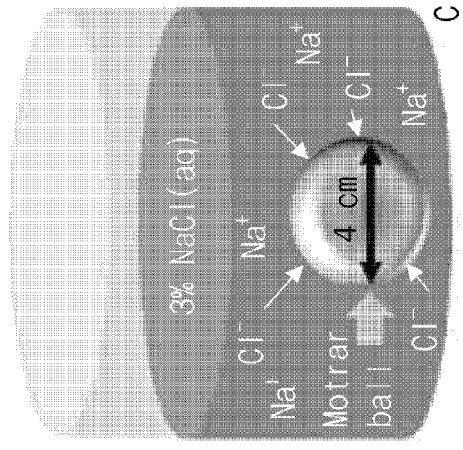

TWO-DIMENSIONAL MATERIAL FOR REMOVAL OF ANIONS AND APPLICATIONS THEREOF

CROSS-REFERENCE TO RELATED APPLICATION

This application is a continuation of pending International Application No. PCT/KR2018/015499, which was filed on Dec. 7, 2018 and claims priority to Korean Patent Application No. 10-2018-0147585, filed on Nov. 26, 2018, in the Korean Intellectual Property Office, the disclosures of which are hereby incorporated by reference in their entireties.

BACKGROUND OF THE INVENTION

Field of the Invention

The present invention relates to a two-dimensional material for removal of anions and applications thereof, and more particularly to a two-dimensional material having increased anion adsorption ability due to at least one anion remaining between cationic layers, and applications thereof.

Description of the Prior Art

Conventionally, in order to remove toxic substances from wastewater, a method of removing toxic anions from wastewater using a porous adsorbent with a large surface area, or using electrolysis and precipitation, or using an ion-exchange resin, has been used.

For example, Korean Patent No. KR101415656B1 discloses a method for preparing an adsorbent for removing anions from wastewater by adsorption, the method comprising the steps of: mixing 100 parts by weight of calcium bentonite with 70 to 90 parts by weight of a cationic surfactant to obtain a mixture; allowing the mixture to react in water at 70 to 90° C. for 6 to 10 hours, thereby obtaining a reaction product; cooling and filtering the reaction product, and removing the filtrate; and a solid, which remains after removing the filtrate, with water, followed by drying, wherein the cationic surfactant is a quaternary ammonium ion composed of a dioctadecyldimethylammonium, dicetyldimethylammonium, didodecyldimethylammonium, dodecyltrimethylammonium, hexadecyltrimethylammonium, octadecyltrimethylammonium, tetradecyltrimethylammonium, tetramethylammonium or trimethylphenylammonium ion combined with a halide anion.

However, if the porous adsorbent as described above is used to remove toxic substances from wastewater, cations can also be removed in addition to toxic anions. Thus, it can be impossible to selectively remove toxic anions. In addition, when electrolysis and precipitation are used to remove toxic substances from wastewater, there are disadvantages in that a complicated process that uses a complicated electrochemical reaction, a settlement aid and an absorption tower is required and in that the use of a large-sized reactor and recovery apparatus imposing spatial constraints is required. Furthermore, when an ion-exchange resin is used to remove toxic substances from wastewater, problems may arise in that the applicable range of pH is limited, the use of the ion-exchange resin at a temperature higher than 70° C. is impossible, and the use of a strongly acidic or strongly alkaline substance causes environmental problems. In addition, the above-described methods for removing toxic anions from wastewater have a problem in that since adsorption and desorption of anions are reversible, the ability to remove toxic anions is reduced.

Therefore, there is a need to develop an anion adsorbent which selectively removes toxic anions, imposes no spatial constraints, is environmentally friendly, and irreversibly adsorbs anions.

SUMMARY OF THE INVENTION

It is an object of the present invention to provide a method for preparing an anion adsorbent which selectively removes toxic anions.

Another object of the present invention is to provide a method for preparing an anion adsorbent which imposes no spatial constraints.

Still another object of the present invention is to provide a method for preparing an anion adsorbent which is environmentally friendly.

Still another object of the present invention is to provide a method for preparing an anion adsorbent which irreversibly adsorbs toxic anions.

Still another object of the present invention is to provide a method of preparing an anion adsorbent by removing anions and water of crystallization while allowing at least one of the anions to remain between cationic layers.

Still another object of the present invention is to provide an anion adsorbent which has an increased specific surface area.

Still another object of the present invention is to provide an anion adsorbent which easily selectively adsorbs target anions.

However, objects which are to be achieved by the present invention are not limited to the above-mentioned objects.

To achieve the above problems, the present invention provides a method for preparing an anion adsorbent.

According to one embodiment, the method for preparing the anion adsorbent may comprise the steps of: mixing at least two metal salts with each other, thereby forming a stack structure in which cationic compound layers and anionic compound layers containing anions and water of crystallization are alternately stacked on one another; performing a first heat treatment on the stack structure to expand between the cationic compound layers, thereby preparing a preliminary anion adsorbent; and performing a second heat treatment on the preliminary anion adsorbent to remove the anions and the water of crystallization from the anionic compound layers while allowing at least one of the anions to remain, thereby preparing the anion adsorbent.

According to one embodiment, the specific surface area of the anion adsorbent may be increased by removal of the anions.

According to one embodiment, the method may further comprise, after preparing the anionic adsorbent, a step of quenching the anion adsorbent in a liquid nitrogen atmosphere.

According to one embodiment, the step of performing the second heat treatment on the preliminary anion adsorbent may comprise controlling the number of the remaining anions by controlling at least one of the temperature and time of the second heat treatment.

According to one embodiment, the number of the remaining anions may be controlled by the amount of the preliminary anion adsorbent which is supplied for a predetermined time to a space in which the second heat treatment is performed.

According to one embodiment, the cationic compound layers may comprise a compound containing a cation and a hydroxide ion.

According to one embodiment, the anions may be monovalent, divalent, or trivalent anions, and the cations may comprise at least two metal ions, wherein the metal ions may be divalent and trivalent.

According to one embodiment, the hydroxide ion of the compound may be removed by the second heat treatment.

According to one embodiment, the step of mixing the at least two metal salts may be performed under a nitrogen atmosphere.

According to one embodiment, the step of performing the second heat treatment may comprise performing heat treatment using microwave plasma.

According to one embodiment, the step of mixing the at least two metal salts may comprise the steps of: performing first pH adjustment while preparing the mixture solution by mixing the at least two metal salts in a solvent; and performing second pH adjustment to a pH lower than the pH achieved by the first pH adjustment.

The present invention also provides an anion adsorbent.

According to one embodiment, the anion adsorbent comprises: a plurality of spaced cationic layers; at least one anion that provides coupling between each adjacent two of the cationic layers; and an empty space between each adjacent two of the cationic layers, wherein a volume occupied by the empty space in a space provided between each adjacent two of the cationic layers is greater than a volume occupied by the anion.

According to one embodiment, the at least one anion may be randomly provided between each adjacent two of the cationic layers.

According to one embodiment, the anion may be two-dimensionally arranged in the empty space between each adjacent two of the cationic layers.

According to one embodiment, externally supplied target anions may be adsorbed into the empty space.

According to one embodiment, the target anions may be toxic anions in wastewaters, including steelmaking wastewater, plating wastewater, household waste, and livestock waste.

According to one embodiment, the anion may be monovalent, divalent, or trivalent anions, and the cationic layer may comprise at least two metal ions, in which the metal ions may comprise divalent and trivalent cationic compounds.

According to one embodiment, the plurality of cationic layers and the at least one anion may be alternately stacked on one another.

According to one embodiment, cations in the cationic layer may comprise at least one of $Mg^{2+}$, $Al^{3+}$, $Ca^{2+}$, and $Fe^{3+}$, and the target anions may comprise at least one of $CN^-$, $Cl^-$, $F^-$, $OH^-$, $Br^-$, $NO_3^-$, $NO_2^-$, $HCO_3^-$, $B(OH)_4^-$, $PO_4^{3-}$, $HPO_4^{2-}$, $SO_4^{2-}$, $Ni(CN)_4^{2-}$, $CO_3^{2-}$, $[M_1(CN)_6]^{3-}$ ($M_1$=Ti, V, Cr, Mn, Fe, or Co), $[M_2(CN)_4]^{2-}$ ($M_2$=Ni, Pd, or Pt), and $[M_3(CN)_2]^-$ ($M_3$=Cu, Ag, or Au).

BRIEF DESCRIPTION OF THE DRAWINGS

FIG. 1 is a flow chart illustrating a method for preparing an anion adsorbent according to an embodiment of the present invention.

FIG. 2 is a view illustrating a method for forming a stack structure according to an embodiment of the present invention.

FIG. 3 is a view illustrating the structure of an anion adsorbent according to an embodiment of the present invention.

FIG. 4 is a view illustrating the structure of an anion adsorbent according to an embodiment of the present invention.

FIG. 5 is a view illustrating the structure of an anion adsorbent according to an embodiment of the present invention.

FIG. 6 is a view illustrating a method in which target anions are adsorbed by an anion adsorbent according to an embodiment of the present invention.

FIG. 7 is a scanning electron microscope (SEM) image of a stack structure according to Example 1 of the present invention.

FIG. 8 is a SEM image of an anion adsorbent according to Example 1 of the present invention.

FIG. 9 is a SEM image of an anion adsorbent according to Comparative Example 1.

FIG. 10 shows the results of X-ray diffraction (XRD) analysis of a stack structure (HTs) and anion adsorbents (Ex-HTs-a and Ex-HTs-b) according to Example 1 of the present invention and an anion adsorbent (C-HTs) according to Comparative Example 1.

FIG. 11 shows the results of XRD analysis of a stack structure (HTs) and anion adsorbents (Ex-HTs-a and Ex-HTs-b) according to Example 2 of the present invention and an anion adsorbent (C-HTs) according to Comparative Example 1.

FIG. 12 shows the results of XRD analysis of a stack structure (HTs) and anion adsorbents (Ex-HTs-a and Ex-HTs-b) according to Example 3 of the present invention and an anion adsorbent (C-HTs) according to Comparative Example 1.

FIG. 13 is a transmission electron microscopy (TEM) image of a stack structure according to Example 1 of the present invention.

FIG. 14 is a TEM image of an anion adsorbent (Ex-HTs-a) according to Example 1 of the present invention.

FIG. 15 is a TEM image of an anion adsorbent (C-HTs) according to Comparative Example 1.

FIG. 16 shows the results of Fourier transform infrared spectroscopy (FT-IR) analysis of a stack structure (HTs) and anion adsorbents (Ex-HTs-a and Ex-HTs-b) according to Example 1 of the present invention and an anion adsorbent (C-HTs) according to Comparative Example 1.

FIG. 17 shows the results of FT-IR analysis of a stack structure (HTs) and anion adsorbents (Ex-HTs-a and Ex-HTs-b) according to Example 2 of the present invention and an anion adsorbent (C-HTs) according to Comparative Example 1.

FIG. 18 shows the results of FT-IR analysis of a stack structure (HTs) and anion adsorbents (Ex-HTs-a and Ex-HTs-b) according to Example 3 of the present invention and an anion adsorbent (C-HTs) according to Comparative Example 1.

FIG. 19 is a graph showing changes in the specific surface areas of a stack structure (HTs) and anion adsorbents (Ex-HTs-a and Ex-HTs-b) according to Example 1 of the present invention and an anion adsorbent (C-HTs) according to Comparative Example 1.

FIG. 20 is a graph showing the results of $Cl^-$ adsorption of a stack structure (HTs) and anion adsorbents (Ex-HTs-a and Ex-HTs-b) according to Example 1 of the present invention and an anion adsorbent (C-HTs) according to Comparative Example 1.

FIG. 21 is a graph showing the result of $Ni(CN)_4^{2-}$ adsorption of an anion adsorbent according to Example 1 of the present invention.

FIG. 22 is a graph showing the result of $Ni(CN)_4^{2-}$ adsorption of an ion exchange resin.

FIG. 23 is a graph showing the result of $PO_4^{3-}$ adsorption of an anion adsorbent according to Example 3 of the present invention.

FIG. 24 is a graph showing the result of $PO_4^{3-}$ adsorption of an anion adsorbent according to Example 1 of the present invention.

FIG. 25 is a graph showing the result of $Cl^-$ adsorption of an anion adsorbent according to Example 3 of the present invention.

FIG. 26 is a graph showing the result of $Cl^-$ adsorption of an anion adsorbent according to Example 1 of the present invention.

FIG. 27 is a graph showing the result of $CO_3^{2-}$ adsorption of an anion adsorbent according to Example 3 of the present invention.

FIG. 28 is a graph showing the result of $CO_3^{2-}$ adsorption of an anion adsorbent according to Example 1 of the present invention.

FIG. 29(a) is a schematic view showing a $Cl^-$ adsorption experiment according to an Example of the present invention.

FIG. 29(b) is a photograph showing the result of $Cl^-$ adsorption of a stack structure (HTs) according to an Example of the present invention.

FIG. 29(c) is a photograph showing the result of $Cl^-$ adsorption of an ion adsorbent (Ex-HTs) according to an Example of the present invention.

DETAILED DESCRIPTION OF THE INVENTION

Hereinafter, exemplary embodiments of the present invention will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the specification, when any element is referred to as being "on" other element, it means that the element may be formed directly on the other element, or that a third element may be interposed therebetween. In the drawings, the thicknesses of layers and regions may have been exaggerated in order to clearly illustrate features of the embodiments.

In addition, although the terms 'first', 'second', "third" etc. may be used to describe various elements in various embodiments of the present invention, these elements should not be limited by these terms. These terms are only used to distinguish any element from other element. Thus, a first element mentioned in any one embodiment may be termed a second element in other embodiment. Each embodiment described and exemplified herein also includes a complementary embodiment thereof. As used herein, the term "and/or" is meant to include at least one of components listed before and after the term "and/or".

In the specification, singular expressions include plural expressions unless clearly specified otherwise in the context thereof. In addition, the terms "comprise", "have", etc., are intended to denote the existence of mentioned characteristics, numbers, steps, elements, components, or combinations thereof, but do not exclude the probability of existence or addition of one or more other characteristics, numbers, steps, elements, components, or combinations thereof.

Furthermore, in the following description, detailed description of related known functions and configurations will be omitted when it may unnecessarily obscure the subject matter of the present invention.

Hereinafter, a method for preparing an anion adsorbent according to embodiments of the present invention will be described.

FIG. 1 is a flow chart illustrating a method for preparing an anion adsorbent according to an embodiment of the present invention; FIG. 2 is a view illustrating a method for forming a stack structure according to an embodiment of the present invention; FIGS. 3 to 5 are views illustrating the structures of anion adsorbents according to embodiments of the present invention; and FIG. 6 is a view illustrating a method in which target anions are adsorbed by an anion adsorbent according to an embodiment of the present invention.

Referring to FIGS. 1 and 2, a stack structure 300 in which cationic compound layers 100 and anionic compound layers 200 containing anions 201 and water of crystallization 202 are alternately stacked on one another may be formed by mixing at least two metal salts with each other (S110). According to an embodiment of the present invention, the at least two metal salts may be $Mg(NO_3)_3$ and $Al(NO_3)_3$. According to another embodiment, the at least two metal salts may be $MgCO_3$ and $Al_2(CO_3)_3$. According to still another embodiment, the at least two metal salts may be $Ca(NO_3)_2 \cdot 4H_2O$ and $Fe(NO_3)_3 \cdot 9H_2O$.

According to an embodiment of the present invention, the step of mixing the metal salts with each other may be performed in a nitrogen atmosphere. In this case, $CO_3^{2-}$ provided from atmospheric carbon dioxide may be prevented from combining with the anions 201. According to one embodiment, the step of mixing the metal salts with each other may be performed at a temperature higher than room temperature. For example, the step of mixing the metal salts may be performed at a temperature of 55° C.

According to an embodiment of the present invention, a first pH adjustment step may be performed while a mixture solution is prepared by mixing the at least two metal salts with each other in a solvent. In the first pH adjustment step, NaOH may be added to adjust the pH of the mixture solution. As a result, the mixture solution may have a pH of 9 to 14.

According to an embodiment of the present invention, after the first pH adjustment step, a second pH adjustment step may be performed to adjust the pH to a pH lower than that adjusted in the first pH adjustment step. Consequently, impurities in the mixture solution prepared from the metal salts may be easily removed. According to one embodiment, the second pH adjustment step may comprise diluting the mixture solution with de-ionized (DI) water until the pH of the mixture solution reaches 7. According to one embodiment, after the second pH adjustment step, the mixture solution may be centrifuged and filtered under vacuum, thereby recovering the stack structure 300.

According to an embodiment of the present invention, the anions 201 may be monovalent or divalent, and cations 111 may comprise at least two metal ions. In this case, the metal ions may be divalent and trivalent. For example, if the at least two metal salts as described above include $Mg(NO_3)_3$ and $Al(NO_3)_3$, then a stack structure 300 may be formed in which cationic compounds 100, containing $Mg^{2+}$ and $Al^{3+}$ 111 and hydroxide ions 121, and anionic compound layers containing $NO_3^-$ 201 and water of crystallization 202, are alternately stacked on each other.

In addition, if the at least two metal salts as described above include $MgCO_3$ and $Al_2(CO_3)_3$, then a stack structure 300 may be formed in which cationic compound layers 100, containing $Mg^{2+}$ and $Al^{3+}$ 111 and hydroxide ions 121, and anionic compound layers 200 containing $CO_3^{2-}$ 201 and water of crystallization 202, are alternately stacked on one another.

In addition, if the at least two metal salts as described above include $Ca(NO_3)_2 \cdot 4H_2O$ and $Fe(NO_3)_3 \cdot 9H_2O$, then a stack structure 300 may be formed in which cationic compound layers 100, containing $Ca^{2+}$ and $Fe^{3+}$ 111 and hydroxide ions 121, and anionic compound layers 200 containing $NO_3^-$ 201 and water of crystallization, are alternately stacked on one another.

Furthermore, the anions 201 may comprise at least one of monovalent anions, including $CN^-$, $Cl^-$, $F^-$, $OH^-$, $Br^-$, $NO_3^-$, and $B(OH)_4^-$, or divalent anions, including $HPO_4^{2-}$, $SO_4^{2-}$, $Ni(CN)_4^{2-}$, and $CO_3^{2-}$. The metal ions may comprise two or more of divalent cations, including $Mg^{2+}$, $Ni^{2+}$ $Zn^{2+}$, $Mn^{2+}$, and $Ca^{2+}$, and trivalent cations, including $Al^{3+}$, $Fe^{3+}$, $Co^{3+}$, and $Cr^{3+}$.

First heat treatment of the stack structure may be performed to expand between the cationic compound layers 100, thereby preparing a preliminary anion adsorbent (not shown) (S120). According to an embodiment of the present invention, the first heat treatment may be performed at 150° C. for 3 hours. Next, the stack structure subjected to the first heat treatment may be freeze-dried at −60° C. and 50 mTorr for 5 days, thereby preparing the preliminary anion adsorbent.

Referring to FIGS. 3 to 5, second heat treatment of the preliminary anion adsorbent may be performed to remove the anions 201 and the water of crystallization 202 from the anionic compound layers 200 while allowing at least one of the anions to remain in the anionic compound layers 200, thereby preparing an anion adsorbent 600 (S130). The second heat treatment may comprise performing heat treatment with microwave plasma. Specifically, for the second heat treatment, a microwave frequency ranging from 300 MHz to 30 GHz may be generated using microwave plasma, and reacted with nitrogen gas, thereby producing a nitrogen plasma flame having a temperature ranging from 300 to 2000° C. If the preliminary anion adsorbent may be sprayed into the nitrogen plasma flame, then the anions 201 and the water of crystallization 202 in the anionic compound layers 200 may be easily removed.

According to an embodiment of the present invention, the second heat treatment may be performed such that the anions 201 are removed while allowing at least one of the anions 201 to remain. Consequently, at least one of the anions 201 may be randomly provided between each adjacent two of the cationic layers 110 and may be two-dimensionally arranged. In other words, the number of the anions 201 that provide coupling between each adjacent two of the cationic layers 110 in the anion adsorbent 600 may be minimized. According to one embodiment, a portion of the cationic layers 110 may be exfoliated despite the presence of the anions 201 that provide coupling between each adjacent two of the cationic layers 110 in the anion adsorbent 600.

According to an embodiment of the present invention, the anions 201 remaining in the anion adsorbent may be fixing points serving to fix the cationic layers 110. In other words, the cationic layers 110 coupled to each other by the anion 201 may be fixed, and an empty space 410 in which the anion 201 is not disposed may be provided between the cationic layers 110. For example, if the number of the anions 201 remaining between the cationic layers 110 is 2, as shown in FIG. 3, the anion adsorbent 600 may include the empty space 400 between the two anions 201 remaining between the cationic layers 110. In this case, the number of the fixing points may be 2. As another example, as shown in FIG. 4, the anion adsorbent 600 may include one anion 201 remaining between the cationic layers 110, as well as the empty space 400. In this case, the number of the fixing point may be 1. As still another example, as shown in FIG. 5, the anion adsorbent 600 may have two fixing points between the cationic layers 110, as well as one fixing point between the cationic layers 110.

According to an embodiment of the present invention, in the space provided between each adjacent two of the cationic layers 110, the volume occupied by the empty space 400 may be greater than the volume occupied by the anion 201. Consequently, the specific surface area of the anion adsorbent 600 including the empty space 400 may increase. Thus, if target anions 500 are externally supplied to the anion adsorbent 600, then the target anions 500 may be easily adsorbed into the empty space of the anion adsorbent 600.

Meanwhile, in the case of a conventional anion adsorbent obtained by completely removing the anions 201 without leaving at least one of the anions 201, unlike the embodiment of the present invention, the specific surface area thereof may be greater than that of the anion adsorbent according to the embodiment of the present invention. As described above, this may be because the cationic layers may be exfoliated without being coupled to each other, due to the absence of the anion 201 serving as a fixing point. However, in this case, if target anions 500 are externally supplied to the anion adsorbent, then the target anions 500 may be hardly adsorbed by the anion adsorbent, because the cationic layers are exfoliated without being coupled to each other.

However, according to the embodiment of the present invention, it is possible to prepare the anion adsorbent 600 including the empty space 400 due to the presence of at least one anion 201 that remains. Consequently, the anion adsorbent 600 has an increased specific surface area while easily adsorbing the target anions 500 in the empty space 400.

According to the embodiment of the present invention, the second heat treatment may remove not only the anions 201 and the water of crystallization 202, but also the hydroxide ions 121 of the cationic compound layers 100. As a result, the empty space 400 between each adjacent two of the cationic layers 110 can further widen, and the specific surface area of the anion adsorbent 600 can further be increased.

According to the embodiment of the present invention, in the second heat treatment, the number of the remaining anions 201 may be controlled. Specifically, the number of the remaining anions 201 may be controlled by controlling the temperature of the second heat treatment. For example, as the temperature of the second heat treatment increases, the number of the remaining anions 201 may decrease. In addition, the number of the remaining anions 201 may be controlled by controlling the time of the second heat treatment. For example, as the time of the second heat treatment becomes longer, the number of the remaining anions 201 may decrease. In addition, the number of the remaining anions 201 may be controlled by the amount of the preliminary anion adsorbent which is supplied for a predetermined time to a space in which the second heat treatment is performed. For example, as the amount of the preliminary anion adsorbent which is supplied for a predetermined time increases, the number of the remaining anions 201 may decrease.

According to the embodiment of the present invention, the method may further comprise, after preparing the anion adsorbent 600, a step of quenching the anion adsorbent in a liquid nitrogen atmosphere. Consequently, the structure of the anion adsorbent 600 after the second heat treatment may be easily maintained. In other words, the coupling and fixing of each adjacent two of the cationic layers 110 may be easily maintained by the remaining anions 201.

The method of preparing the anion adsorbent 600 according to the embodiment of the present invention has been described above.

According to an embodiment of the present invention, there may be provided a method for preparing an anion adsorbent 600, comprising the steps of: mixing at least two metal salts with each other, thereby forming a stack structure 300 in which cationic compound layers 100 and anionic compound layers 200 containing anions 201 and water of crystallization 202 are alternately stacked on one another; performing a first heat treatment on the stack structure 300 to expand between the cationic compound layers 100, thereby preparing a preliminary anion adsorbent; and performing a second heat treatment on the preliminary anion adsorbent to remove the anions 201 and the water of crystallization 202 from the anionic compound layers 200 while allowing at least one of the anions 201 to remain, thereby preparing the anion adsorbent 600.

Referring to FIG. 6, when the method for preparing the anion adsorbent 600 is used, the prepared anion adsorbent 600 may comprise: a plurality of spaced cationic layers 110; at least one anion 201 that provides coupling between each adjacent two of the cationic layers 110 to each other; and an empty space 400 between each adjacent two of the cationic layers 110, wherein the volume occupied by the empty space 400 in the space provided between each adjacent two of the cationic layers 110 is greater than the volume occupied by the anion 201. According to an embodiment of the present invention, the at least one anion 201 is randomly provided between the cationic layers 110 and is two-dimensionally arranged, and thus the anion adsorbent 600 may have an increased specific surface area. When target anions 500 are externally supplied to the anion adsorbent 600, the target anions 500 may be easily adsorbed into the empty space 400 of the anion adsorbent 600.

According to one embodiment, the target anions 500 may be toxic anions. Specifically, the target anions 500 may be toxic anions in wastewaters, including steelmaking wastewater, plating wastewater, household wastewater, and livestock wastewater. For example, the toxic anions may include at least one of $CN^-$, $Cl^-$, $F^-$, $OH^-$, $Br^-$, $NO_3^-$, $B(OH)_4^-$, $HPO_4^{2-}$, $SO_4^{2-}$, $Ni(CN)_4^{2-}$, $CO_3^{2-}$, $Fe(CN)_6^{3-}$, and $Fe(CN)_6^{4-}$.

According to an embodiment of the present invention, the anion adsorbent 600 may be supplied to wastewater. In this case, the anion adsorbent 600 may adsorb target anions 500, for example, $Cl^-$ contained in steelmaking wastewater, $Ni(CN)_4^{2-}$ contained in plating wastewater, or $PO_4^{3-}$ contained in household wastewater and livestock wastewater, thereby preventing environmental pollution.

According to another embodiment of the present invention, the anion adsorbent 600 may be supplied to a reinforced concrete building. In this case, it is possible to prevent $Cl^-$ from being adsorbed onto the rebar of the reinforced concrete building, thereby preventing the corrosion of the rebar, and it is also possible to prevent $CO_3^{2-}$ from being adsorbed onto the concrete of the reinforced concrete building, thereby preventing the expansion in volume of the concrete.

Hereinafter, specific examples of the present invention will be described.

Example 1: Preparation of Anion Adsorbent $Mg(NO_3)_3$ and $Al(NO_3)_3$ were prepared.

The internal temperature of a 2000-ml glass reactor was set at 55° C., and a nitrogen atmosphere was formed in the reactor.

In the glass reactor, 27.34 g of $Mg(NO_3)_3$ and 10 g of $Al(NO_3)_3$ were added to 1000 ml of ultrapure water such that the molar ratio of Mg:Al would be 4:1. The added metal salts were mixed at a stirring speed of 500 rpm, thereby preparing a mixture solution. During the mixing, 3 M NaOH was supplied to the mixture at a rate of 2 ml/min until the pH reached 9 to 14.

Next, the mixture solution was stirred for 12 hours, and diluted with DI water until the pH reached 7. The diluted mixture solution was centrifuged and filtered under vacuum, thereby forming a stack structure in which cationic compound layers, containing cations ($Mg^{2+}$ and $Al^{3+}$) and hydroxide ions, and anionic compound layers containing anions ($NO_3^-$) and water of crystallization, were alternately stacked on one another.

The stack structure was subjected to first heat treatment at 150° C. for 3 hours, and then freeze-dried at −60° C. and 50 mTorr for 5 days, thereby preparing a preliminary anion adsorbent.

For second heat treatment, a microwave frequency ranging from 300 MHz to 30 GHz was generated using microwave plasma and reacted with nitrogen gas, thereby producing a nitrogen plasma flame having a temperature ranging from 300 to 2000° C. The preliminary anion adsorbent was sprayed into the nitrogen plasma flame such that the anions and the water of crystallization were removed from the anionic compound layers while allowing at least one of the anions to remain, thereby preparing an anion adsorbent according to Example 1.

Example 2: Preparation of Anion Adsorbent

This Example was performed in the same manner as described in Example 1 above, except that $MgCO_3$ and $Al_2(CO_3)_3$ were added such that the molar ratio of Mg:Al would be 2:1, thereby forming a stack structure in which cationic compound layers, containing cations ($Mg^{2+}$ and $Al^{3+}$) and hydroxide ions, and anionic compound layers containing anions ($NO_3^-$) and water of crystallization, were alternately stacked on one another.

Next, first and second heat treatments were performed in the same manner as described in Example 1, thereby preparing an anion adsorbent according to Example 2.

Example 3: Preparation of Anion Adsorbent $Ca(NO_3)_2 \cdot 4H_2O$ and $Fe(NO_3)_3 \cdot 9H_2O$ were prepared.

In a 600-ml glass reactor, 4.7 g of $Ca(NO_3)_2 \cdot 4H_2O$ and 4 g of $Fe(NO_3)_3 \cdot 9H_2O$ were mixed in 300 ml of ultrapure water at a stirring speed of 800 rpm, thereby preparing a mixture solution. During the mixing, 0.3 M NaOH was supplied to the mixture at a rate of 300 ml/min.

Next, the mixture solution was stirred for 18 hours, and diluted with DI water until the pH reached 7. The diluted mixture solution was centrifuged and filtered under vacuum, thereby forming a stack structure in which cationic compound layers, containing cations ($Ca^{2+}$ and $Fe^{3+}$) and hydroxide ions, and anionic compound layers containing anions ($NO_3$) and water of crystallization, were alternately stacked on one another.

The stack structure was subjected to first heat treatment at 100° C. for 3 hours, and then subjected to second heat treatment in the same manner as described in Example 1 above, thereby preparing an anion adsorbent according to Example 3.

Comparative Example 1: Preparation of Anion Adsorbent

A stack structure formed as described in Example 1 above was calcined at high temperature, and the anions in the anionic compound layer were completely removed, thereby preparing an anion adsorbent according to Comparative Example 1.

The anion adsorbents according to Examples 1 to 3 and the anion adsorbent according to Comparative Example 1 can be summarized as shown in Table 1 below.

TABLE 1

|  | Cations (molar ratio) | Cations |
| --- | --- | --- |
| Example 1 | $Mg^{2+}$ and $Al^{3+}$ (4:1) | $NO_3^-$ |
| Example 2 | $Mg^{2+}$ and $Al^{3+}$ (2:1) | $CO_3^-$ |
| Example 3 | $Ca^{2+}$ and $Fe^{3+}$ (2:1) | $NO_3^-$ |
| Comparative Example 1 | $Mg^{2+}$ and $Al^{3+}$ (4:1) | N/A |

FIG. 7 is a scanning electron microscope (SEM) image of the stack structure according to Example 1 of the present invention; FIG. 8 is a SEM image of the anion adsorbent according to Example 1 of the present invention; and FIG. 9 is a SEM image of the anion adsorbent according to Comparative Example 1.

Referring to FIG. 7, it can be observed that the stack structure according to Example 1 of the present invention has a layered structure between the cationic compound layers. Meanwhile, referring to FIG. 8, it can be observed that the anion adsorbent includes cationic layers having a spacing which is greater than the spacing between the cationic compound layers of the stack structure according to Example 1 of the present invention. Meanwhile, referring to FIG. 9, it can be observed that the anion adsorbent according to Comparative Example 1 is completely free of the anions, and thus is powder having a fine layered structure.

Consequently, it can be seen that the anion adsorbent according to the Example of the present invention includes an empty space while having an increased specific surface area, and thus if target anions are supplied to the anion adsorbent, then the target anions can be easily adsorbed into the empty space of the anion adsorbent. On the other hand, the anion adsorbent according to the Comparative Example has an increased specific surface area due to complete exfoliation between the cationic layers, but the target anions are not easily adsorbed by the anion adsorbent according to the Comparative Example because anion adsorbent does not include the empty space.

FIG. 10 shows the results of X-ray diffraction (XRD) analysis of the stack structure (HTs) and anion adsorbents (Ex-HTs-a and Ex-HTs-b) according to Example 1 of the present invention and the anion adsorbent (C-HTs) according to Comparative Example 1; FIG. 11 shows the results of XRD analysis of the stack structure (HTs) and anion adsorbents (Ex-HTs-a and Ex-HTs-b) according to Example 2 of the present invention and the anion adsorbent (C-HTs) according to Comparative Example 1; and FIG. 11 shows the results of XRD analysis of the stack structure (HTs) and anion adsorbents (Ex-HTs-a and Ex-HTs-b) according to Example 3 of the present invention and the anion adsorbent (C-HTs) according to Comparative Example 1.

According to the Example of the present invention, as described above, the anion adsorbent may include at least one of the anions, which is randomly provided between the cationic layers and is two-dimensionally arranged. In addition, the number of the anions that provide coupling between the cationic layers in the anion adsorbent can be minimized (Ex-HTs-a). In addition, according to one embodiment, a portion of the cationic layers in the anion adsorbent may be exfoliated despite the presence of the anions that provide coupling between the cationic layers (Ex-HTs-b). According to the Example of the present invention, the Ex-HTs-a may be heat-treated at higher temperature for longer time than the Ex-HTs-b. Consequently, the number of the anions that provide coupling between the cationic layers in the Ex-HTs-a can be minimized.

Referring to FIG. 10, it can be seen that the stack structure and anion adsorbent according to Example 1 includes $(Mg_{0.83}Al_{0.17}(OH)_2^-)((NO_3)_{0.17}).0.5H_2$. Referring to FIG. 11, it can be seen that the stack structure and anion adsorbent according to Example 2 includes $(Mg_{0.667}Al_{0.333})(OH)_2(CO_3)_{0.167}(H_2O)_{0.5}$. Referring to FIG. 11, it can be seen that the stack structure and anion adsorbent according to Example 3 includes $Ca_2Fe(OH)_6NO_3.2H_2O$. It can be confirmed that the stack structures according to Examples 1 to 3 of the present invention have a layered hydroxide structure, whereas the anion adsorbents according to Examples 1 to 3 of the present invention lose the layered hydroxide structure while the layered hydroxide structure changes to a metal oxide crystalline phase.

On the other hand, it can be observed that the anion adsorbent according to Comparative Example 1 is completely free of the anions, and thus has a more distinct metal oxide crystalline phase than the anion adsorbents according to the Examples of the present invention.

FIG. 13 is a transmission electron microscope (TEM) image of the stack structure (HTs) according to Example 1 of the present invention; FIG. 14 is a TEM image of an anion adsorbent (Ex-HTs-a) according to Example 1 of the present invention; and FIG. 15 is a TEM image of an anion adsorbent (C-HTs) according to Comparative Example 1.

Referring to FIG. 13, the stack structure including Mg and Al at a molar ratio of 4:1 can be observed, and referring to FIG. 14, the anion adsorbent including Mg and Al at a molar ratio of 4:1 can be observed. Referring to FIG. 15, as described above with reference to FIG. 12, it can be observed that the anion adsorbent according to Comparative Example 1 includes a metal oxide crystalline phase in larger amounts than the anion adsorbent according to Example 1 of the present invention.

FIG. 16 shows the results of Fourier transform infrared spectroscopy (FT-IR) analysis of the stack structure (HTs) and anion adsorbents (Ex-HTs-a and Ex-HTs-b) according to Example 1 of the present invention and the anion adsorbent (C-HTs) according to Comparative Example 1; FIG. 17 shows the results of FT-IR analysis of the stack structure (HTs) and anion adsorbents (Ex-HTs-a and Ex-HTs-b) according to Example 2 of the present invention and the anion adsorbent (C-HTs) according to Comparative Example 1; and FIG. 18 shows the results of FT-IR analysis of the stack structure (HTs) and anion adsorbents (Ex-HTs-a and Ex-HTs-b) according to Example 3 of the present invention and the anion adsorbent (C-HTs) according to Comparative Example 1.

Referring to FIGS. 16 to 18, whether or not the number of the anions that provide coupling between the cationic layers would be decreased can be confirmed. It can be seen that, when the anion adsorbent contained $NO_3^-$ as anions (FIGS. 16 and 18) or contained $CO_3^{2-}$ as anions (FIG. 17), the amount of the anions in the anion adsorbents according to Examples 1 to 3 of the present invention was significantly decreased compared to that in the stack structures, but the anions remained between the cationic layers.

On the other hand, as shown in FIGS. 16 to 18, the anion adsorbent according to Comparative Example 1 was completely free of the anions.

Meanwhile, it can be confirmed that, according to Examples 1 to 3 of the present invention, the hydroxide ions are completely removed from the stack structures by the second heat-treatment step.

FIG. 19 is a graph showing changes in the specific surface areas of the stack structure (HTs) and anion adsorbents (Ex-HTs-a and Ex-HTs-b) according to Example 1 of the present invention and the anion adsorbent (C-HTs) according to Comparative Example 1.

Referring to FIG. 19, it can be seen that the stack structure according to Example 1 of the present invention has a BET specific surface area of 7.4323 $m^2/g$. In addition, it can be seen that the anion adsorbents according to Example 1 of the present invention have BET specific surface areas of 20.8829 $m^2/g$ (Ex-HTs-a) and 95.9590 $m^2/g$ (Ex-HTs-b), which are about 3 to 15-fold larger than the stack structure due to the decrease in the number of the anions. On the other hand, it can be observed that the anion adsorbent according to Comparative Example 1 is completely free of the anions, and thus has a BET specific surface area of 151.6073 $m^2/g$ (C-HTs), which is about 20-fold larger than the stack structure.

FIG. 20 is a graph showing the results of $Cl^-$ adsorption of the stack structure (HTs) and anion adsorbents (Ex-HTs-a and Ex-HTs-b) according to Example 1 of the present invention and the anion adsorbent (C-HTs) according to Comparative Example 1.

Referring to FIG. 20, it can be seen that the Ex-HTs-a adsorbed 77% of $Cl^-$ over 3 hours. On the other hand, it can be seen that the Ex-HTs-b adsorbed $Cl^-$ at a lower rate than the Ex-HTs-a, and the anion adsorbent according to Comparative Example 1 adsorbed $Cl^-$ at a rate which is at least 7-fold lower than the Ex-HTs-b. In other words, it can be seen that the removal rate of $Cl^-$ is at least 7-fold higher when using the Ex-HTs-a than when using the anion adsorbent according to Comparative Example 1.

Consequently, it can be seen that although the anion adsorbent according to Comparative Example 1 has a specific surface area which is 20-fold larger than the stack structure according to Example 1 of the present invention, it can hardly adsorb $Cl^-$ because the anions do not remain between the cationic layers of the anion adsorbent.

FIG. 21 is a graph showing the result of $Ni(CN)_4^{2-}$ adsorption of the anion adsorbent according to Example 1 of the present invention, and FIG. 22 is a graph showing the result of $Ni(CN)_4^{2-}$ adsorption of an ion exchange resin.

Referring to FIGS. 21 and 22, it can be seen that the anion adsorbent according to Example 1 of the present invention adsorbed 79.2% of $Ni(CN)_4^{2-}$ over 3 hours. On the other hand, it can be observed that the ion exchange resin adsorbed little or no $Ni(CN)_4^{2-}$.

Thus, it can be seen that $Ni(CN)_4^{2-}$ is hardly removed by the ion exchange resin, but can be easily removed by the anion adsorbent.

FIG. 23 is a graph showing the results of $PO_4^{3-}$ adsorption of the anion adsorbent according to Experimental Example 3 of the present invention, and FIG. 24 is a graph showing the results of $PO_4^{3-}$ adsorption of the anion adsorbent according to Experimental Example 1 of the present invention.

Referring to FIGS. 23 and 24, it can be seen that the anion adsorbent according to Example 3 of the present invention adsorbed $PO_4^{3-}$ over 30 hours at a rate which is 18-fold higher than the anion adsorbent according to Example 1 of the present invention.

Consequently, it can be seen that if the anion adsorbent contains $Ca^{2+}$ and $Fe^{3+}$ as cations at a molar ratio of 2:1 and $NO_3$ as anions, then it has an excellent ability to adsorb $PO_4^{3-}$.

FIG. 25 is a graph showing the results of $Cl^-$ adsorption of the anion adsorbent according to Example 3 of the present invention, and FIG. 26 is a graph showing the results of $Cl^-$ adsorption of the anion adsorbent according to Example 1 of the present invention.

Referring to FIGS. 25 and 26, it can be seen that the anion adsorbent according to Example 3 of the present invention adsorbed 51% of CT, whereas the anion adsorbent according to Example 1 of the present invention adsorbed 89% or more of Cl.

Consequently, it can be seen that if the anion adsorbent contains $Mg^{2+}$ and $Al^3$ as cations at a molar ratio of 4:1 and $NO_3$ as anions, then it has an excellent ability to adsorb $Cl^-$.

FIG. 27 is a graph showing the results of $CO_3^{2-}$ adsorption of the anion adsorbent according to Example 3 of the present invention, and FIG. 28 is a graph showing the results of $CO_3^{2-}$ adsorption of the anion adsorbent according to Example 1 of the present invention.

Referring to FIGS. 27 and 28, it can be seen that the $CO_3^{2-}$ adsorption of the anion adsorbent according to Example 1 of the present invention is 3.6-fold higher than that of the anion adsorbent according to Example 3 of the present invention.

Consequently, it can be seen that if the anion adsorbent contains $Mg^{2+}$ and $Al^{3+}$ as cations at a molar ratio of 4:1 and $NO_3$ as anions, then it has an excellent ability to adsorb $CO_3^{2-}$.

FIG. 29($a$) is a schematic view showing a $Cl^-$ adsorption experiment according to the Example of the present invention; FIG. 29($b$) is a photograph showing the result of $Cl^-$ adsorption of the stack structure (HTs) according to the Example of the present invention; and FIG. 29($c$) is a photograph showing the result of $Cl^-$ adsorption of an ion adsorbent (Ex-HTs) according to the Example of the present invention.

As shown in FIG. 29($a$), in order to evaluate the performance of an anion adsorbent that prevents $Cl^-$ from permeating into a reinforced concrete structure, the degree of permeation of CF can be measured after the anion adsorbent is added to a mortar ball having a diameter of 4 cm.

Referring to FIG. 29($b$), it can be seen that if the stack structure according to the Example of the present invention was used, then $Cl^-$ completely permeated into the mortar ball at a rate of 0.4 cm/day.

On the other hand, referring to FIG. 29($c$), it can be seen that when the anion adsorbent according to the Example of the present invention was used, $Cl^-$ did not completely permeate into the mortar ball, but permeated about 1.15 cm inward from the surface of the mortar ball at a rate of 0.115 cm/day.

This suggests that the anion adsorbent according to the Example of the present invention adsorbs Cl$^-$, thereby preventing Cl$^-$ from completely permeating into the mortar ball. From these experimental results, it can be seen that if the anion adsorbent is added to mortar, then it can prevent Cl$^-$ from completely permeating into the mortar, thereby easily preventing the corrosion of a reinforced concrete structure.

As described above, according to the embodiment of the present invention, there may be provided a method for preparing an anion adsorbent, comprising the steps of: mixing at least two metal salts with each other, thereby forming a stack structure in which cationic compound layers and anionic compound layers containing anions and water of crystallization are alternately stacked on one another; performing a first heat treatment on the stack structure to expand between the cationic compound layers, thereby preparing a preliminary anion adsorbent; and performing a second heat treatment on the preliminary anion adsorbent to remove the anions and the water of crystallization from the anionic compound layers while allowing at least one of the anions to remain, thereby preparing the anion adsorbent. The anion adsorbent prepared according to the method has an increased specific surface area and can easily selectively adsorb target anions.

The foregoing has described in detail a method of preparing an anion adsorbent according to an embodiment of the present invention and an anion adsorbent prepared by the method. Although the present invention has been described above in detail with reference to exemplary embodiments thereof, the scope of the present invention is not limited to these embodiments and should be construed based on the appended claims. In addition, any person of ordinary skill in the art will appreciate that various modifications and alterations are possible without departing from the scope of the present invention.

What is claimed is:

1. An anion adsorbent comprising:
a plurality of spaced cationic layers;
at least one anion that provides coupling between each adjacent two of the cationic layers; and
an empty space between each adjacent two of the cationic layers,
wherein a volume occupied by the empty space in a space provided between each adjacent two of the cationic layers is greater than a volume occupied by the at least one anion; and
wherein a distance between the two adjacent cationic layers where the at least one anion provides coupling is shorter than a distance between the two adjacent cationic layers forming the empty space.

2. The anion adsorbent of claim 1, wherein the at least one anion is randomly provided between each adjacent two of the cationic layers.

3. The anion adsorbent of claim 1, wherein the at least one anion is arranged in the empty space between each adjacent two of the cationic layers.

4. The anion adsorbent of claim 1, wherein an externally supplied target anion is adsorbed into the empty space.

5. The anion adsorbent of claim 1, wherein the target anion is a toxic anion in wastewaters, including steelmaking wastewater, plating wastewater, household waste, and livestock waste.

6. The anion adsorbent of claim 1, wherein the at least one anion includes a monovalent, divalent, or trivalent anion, and the cationic layers comprise at least two metal ions, in which the metal ions comprise a divalent metal ion and a trivalent metal ion.

7. The anion adsorbent of claim 1, wherein the plurality of cationic layers and the at least one anion are alternately stacked on one another.

8. The anion adsorbent of claim 4, wherein
a cation in the cationic layers comprises one or more of $Mg^{2+}$, $Al^{3+}$, $Ca^{2+}$, and $Fe^{3+}$, and
the target anion comprises one or more of $CN^-$, $Cl^-$, $F^-$, $OH^-$, $Br^-$, $NO_3^-$, $NO_2^-$, $HCO_3^-$, $B(OH)_4^-$, $PO_4^{3-}$, $HPO_4^{2-}$, $SO_4^{2-}$, $Ni(CN)_4^{2-}$, $CO_3^{2-}$, $[M_1(CN)_6]^{3-}$ ($M_1$=Ti, V, Cr, Mn, Fe, or Co), $[M_2(CN)_4]^{2-}$ ($M_2$=Ni, Pd, or Pt), and $[M_3(CN)_2]^-$ ($M_3$=Cu, Ag, or Au).

* * * * *